(12) United States Patent
Kogure

(10) Patent No.: US 10,096,028 B2
(45) Date of Patent: Oct. 9, 2018

(54) INFORMATION PROCESSOR, NON-TRANSITORY COMPUTER READABLE MEDIUM, AND INFORMATION PROCESSING METHOD FOR ASSOCIATING SETS OF DATA VALUES

(71) Applicant: FUJI XEROX CO., LTD., Tokyo (JP)

(72) Inventor: Yosuke Kogure, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 206 days.

(21) Appl. No.: 15/044,682

(22) Filed: Feb. 16, 2016

(65) Prior Publication Data

US 2017/0083215 A1 Mar. 23, 2017

(30) Foreign Application Priority Data

Sep. 17, 2015 (JP) .................................. 2015-183864

(51) Int. Cl.
*G06F 3/0481* (2013.01)
*G06Q 30/00* (2012.01)
*G06F 17/30* (2006.01)

(52) U.S. Cl.
CPC .............. *G06Q 30/00* (2013.01); *G06F 17/30* (2013.01)

(58) Field of Classification Search
CPC .......... G06F 3/00; G06F 3/048; G06F 3/0481; G06F 3/0482; G06F 3/0484; G06F 3/04842; G06F 3/0486; G06F 17/30
See application file for complete search history.

(56) References Cited

U.S. PATENT DOCUMENTS

| | | | | |
|---|---|---|---|---|
| 8,832,588 | B1* | 9/2014 | Kerzner | G06F 3/0481 715/212 |
| 2008/0244456 | A1* | 10/2008 | Shimizu | G06F 3/0481 715/840 |
| 2013/0275902 | A1* | 10/2013 | Shimizu | G06F 3/0481 715/769 |
| 2015/0074541 | A1* | 3/2015 | Schwartz | G06F 9/44 715/740 |
| 2016/0110336 | A1* | 4/2016 | Wolters | G06F 3/0481 715/227 |
| 2017/0235446 | A1* | 8/2017 | Stolte | G06F 3/0482 715/854 |

FOREIGN PATENT DOCUMENTS

JP 2008-242846 A 10/2008
JP 2013-137829 A 7/2013

* cited by examiner

Primary Examiner — Xiomar L Bautista
(74) Attorney, Agent, or Firm — Oliff PLC

(57) ABSTRACT

An information processor includes a defining unit that defines a set of metadata items, and a set of data values of metadata corresponding to the set of metadata items, the set of metadata items and the set of data values being associated with each of multiple specifying areas displayed on a screen, and an associating unit that associates two or more sets of data values with actual data, the two or more sets of data values being each defined for each of two or more specifying areas specified from among the multiple specifying areas.

11 Claims, 21 Drawing Sheets

FIG. 6

| DATA VALUE ENTRY SCREEN | | | | | |
|---|---|---|---|---|---|
| FIRST SET | | SECOND SET | | THIRD SET | |
| APPL. CLASS. | TRADING COUNTRY | DIVISION | LOADING PORT | CERTIFICATE NO. | |
| A | CHI | 1 | TOKYO | A1 | |
| B | USA | 1 | YOKOHAMA | B1 | |
| A | UK | 2 | NAGOYA | C1 | |
| C | USA | 3 | OSAKA | D1 | |
| ... | ... | ... | ... | ... | |

68
68A
68B SET
68C CANCEL

FIG. 15

| CASE NO. | FIRST SET | | SECOND SET | | THIRD SET | STEP 1 |
| --- | --- | --- | --- | --- | --- | --- |
| | APPL. CLASS. | TRADING COUNTRY | DIVISION | LOADING PORT | CERTIFICATE NO. | |
| X01 | A | CHI | 1 | TOKYO | A1 | C:¥CASE MANAGEMENT¥X01...¥CONTRACT.xdw |
| X02 | B | USA | 1 | YOKOHAMA | B1 | id=x02&APPLICATION CLASS.=B&TRADING COUNTRY=USA&DIVISION=1&LOADING PORT=YOKOHAMA&CERTIFICATE NO.=B1 |
| X03 | A | UK | 2 | NAGOYA | C1 | |
| X04 | C | USA | 3 | OSAKA | D1 | http://www.abc/documentManagement/id=x04 |
| ⋮ | ⋮ | ⋮ | ⋮ | ⋮ | ⋮ | ⋮ |

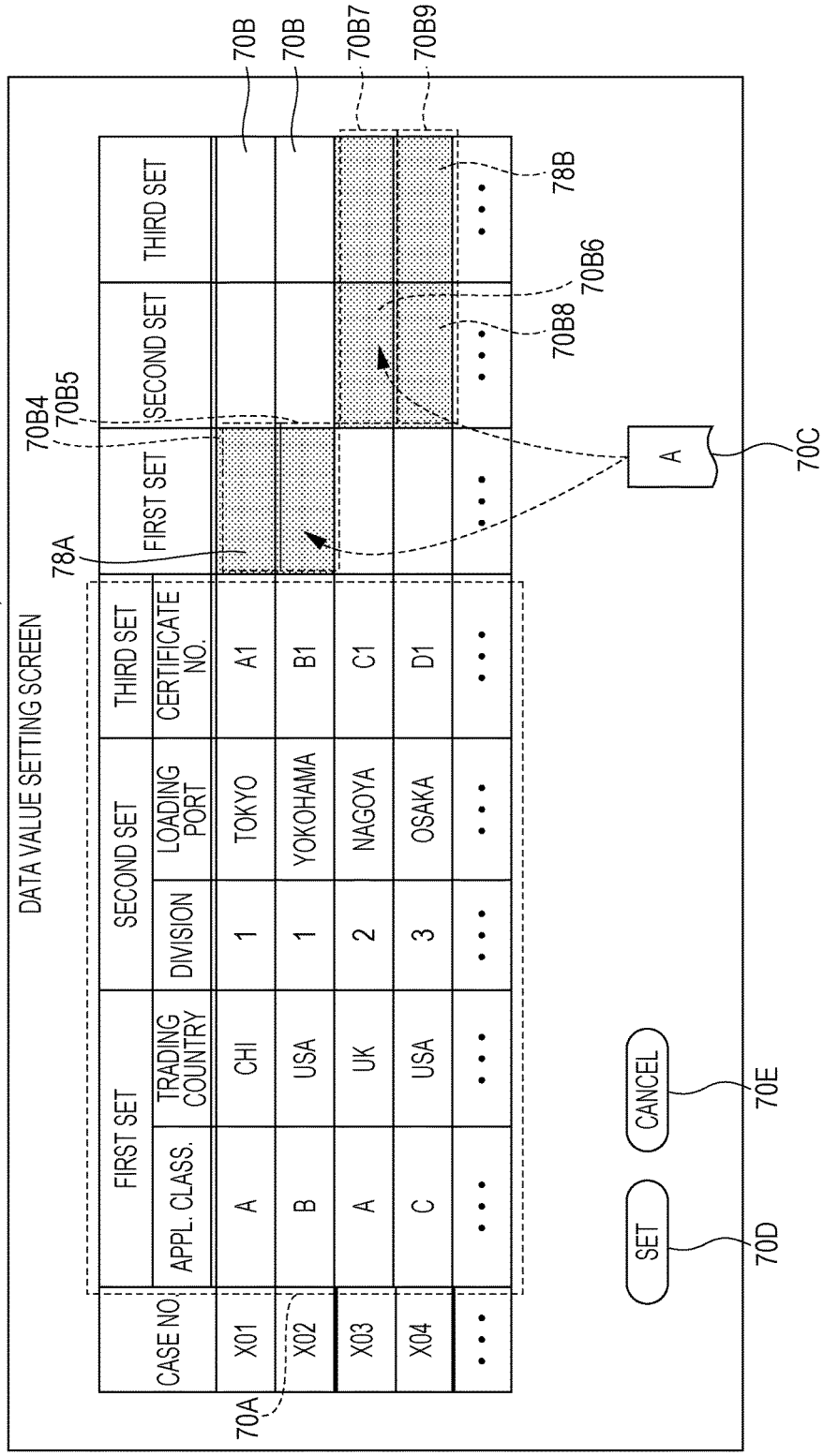

FIG. 18A

REGISTRATION SCREEN (72)

| CASE NO. | METADATA | DATA VALUE |
|---|---|---|
| X01 | APPL. CLASS. | A |
|  | TRADING COUNTRY | CHI |
| X02 | APPL. CLASS. | B |
|  | TRADING COUNTRY | USA |
| X03 | DIVISION | 2 |
|  | LOADING PORT | NAGOYA |
|  | CERTIFICATE NO. | C1 |
| X04 | DIVISION | 3 |
|  | LOADING PORT | OSAKA |
|  | CERTIFICATE NO. | D1 |

72A, 72B, 72B, 72B1, 72B2, 72B3, 72E

AREA FOR SPECIFYING ACTUAL DATA (72D)

LIST OF ACTUAL DATA TO BE REGISTERED: A

[B] [C] [D] (72C 72C 72C)

(REGISTER) 72F  (CANCEL) 72G

FIG. 18B

REGISTRATION SCREEN (72)

| CASE NO. | METADATA | DATA VALUE |
|---|---|---|
| X01 | APPL. CLASS. | A |
|  | TRADING COUNTRY | CHI |
| X02 | APPL. CLASS. | B |
|  | TRADING COUNTRY | UK |
| X03 | DIVISION | 2 |
|  | LOADING PORT | OSAKA |
|  | CERTIFICATE NO. | C1 |
| X04 | DIVISION | 2 |
|  | LOADING PORT | OSAKA |
|  | CERTIFICATE NO. | D1 |

72A, 72B, 72B, 72B1, 72B2, 72B3, 72E

AREA FOR SPECIFYING ACTUAL DATA (72D)

LIST OF ACTUAL DATA TO BE REGISTERED: A

[B] [C] [D] (72C 72C 72C)

(REGISTER) 72F  (CANCEL) 72G

FIG. 22

| LIST OF METADATA ITEMS |
|---|
| ARTIST NAME |
| ALBUM TITLE |
| GENRE |
| IMAGE |
| YEAR RELEASED |
| RATING |

FIG. 23

| IDENTIFICATION INFORMATION OF SET OF METADATA ITEMS | LIST OF METADATA ITEMS |
|---|---|
| FIRST SET | ARTIST NAME |
| | RATING |
| SECOND SET | ARTIST NAME |
| | IMAGE |
| | ALBUM TITLE |
| THIRD SET | YEAR RELEASED |
| | GENRE |

INFORMATION PROCESSOR, NON-TRANSITORY COMPUTER READABLE MEDIUM, AND INFORMATION PROCESSING METHOD FOR ASSOCIATING SETS OF DATA VALUES

CROSS-REFERENCE TO RELATED APPLICATIONS

This application is based on and claims priority under 35 USC 119 from Japanese Patent Application No. 2015-183864 filed Sep. 17, 2015.

BACKGROUND

Technical Field

The present invention relates to an information processor, a non-transitory computer readable medium, and an information processing method.

SUMMARY

According to an aspect of the invention, there is provided an information processor including a defining unit that defines a set of metadata items, and a set of data values of metadata corresponding to the set of metadata items, the set of metadata items and the set of data values being associated with each of multiple specifying areas displayed on a screen, and an associating unit that associates two or more sets of data values with actual data, the two or more sets of data values being each defined for each of two or more specifying areas specified from among the multiple specifying areas.

BRIEF DESCRIPTION OF THE DRAWINGS

Exemplary embodiments of the present invention will be described in detail based on the following figures, wherein:

FIG. 6 schematically illustrates an example of a data value entry screen according to an exemplary embodiment;

FIG. 15 schematically illustrates yet still another example of metadata information according to the first exemplary embodiment;

FIG. 17 schematically illustrates an example of a data value setting screen according to the second exemplary embodiment;

FIG. 18A schematically illustrates an example of a registration screen before being changed according to the second exemplary embodiment;

FIG. 18B schematically illustrates an example of a registration screen after being changed according to the second exemplary embodiment;

FIG. 22 schematically illustrates another example of metadata items according to an exemplary embodiment; and FIG. 23 schematically illustrates another example of the structure of metadata according to an exemplary embodiment.

DETAILED DESCRIPTION

Hereinafter, an information processor according to exemplary embodiments of the invention will be described with reference to the attached drawings.

First Exemplary Embodiment

First, an information processor according to a first exemplary embodiment will be described in detail. For example, in a registration of a document file into an electronic document management system, metadata indicating the characteristics of the document file is often added to the actual data of the document file (actual content file) to ease management. In this case, it is common to add each individual piece of metadata to each corresponding document file by user's operation. This necessitates a cumbersome operation when there are a large number of document files to be registered and, further, a different piece of metadata is to be added to each document file, as the user needs to perform the registration process over and over again. This makes it desirable that multiple pieces of metadata be added to multiple document files through simple operation.

Accordingly, the information processor according to the first exemplary embodiment defines the following sets of data to be associated with each of multiple specifying areas displayed on a screen: a set of one or more metadata items (to be also referred to simply as "set of metadata items" hereinafter), and a set of one or more data values of metadata (to be also referred to simply as "set of data values" hereinafter) corresponding to the set of metadata items. Further, the information processor according to the first exemplary embodiment associates, with actual data, two or more sets of data values each defined for each of two or more specifying areas specified from among the multiple specifying areas.

Figure 1:
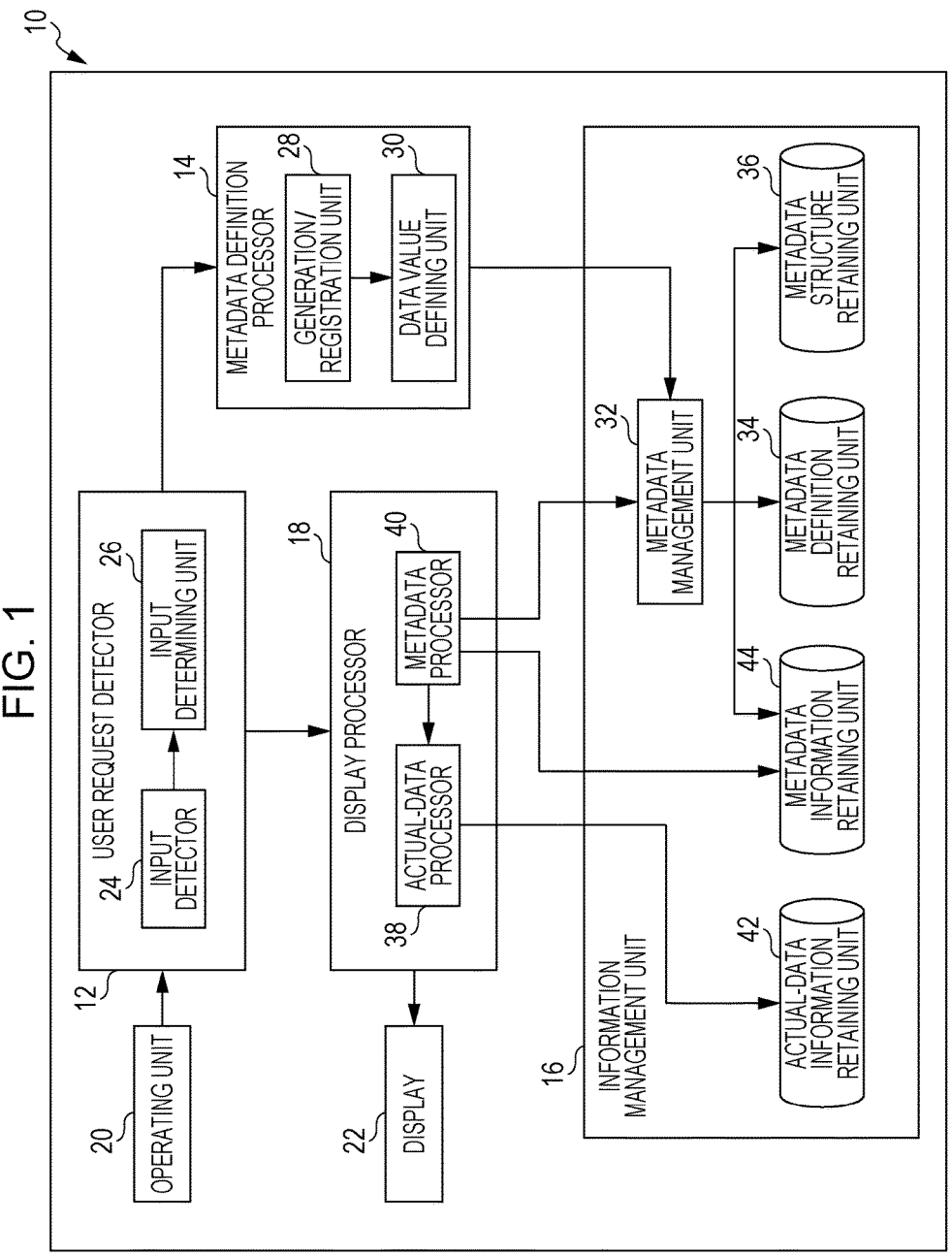
FIG. 1 is a block diagram illustrating the functional configuration of an information processor according to an exemplary embodiment.

As illustrated in FIG. 1, an information processor 10 according to the first exemplary embodiment has a user request detector 12, a metadata definition processor 14, which is an example of a defining unit, an information management unit 16, and a display processor 18, which is an example of an associating unit. The information processor 10 also has an operating unit 20 operated by the user to input data, such as a keyboard or a mouse, and a display 22 that displays data.

The user request detector 12 has an input detector 24. When the input detector 24 receives input of a request to refer to metadata made by user's operation of the operating unit 20, such as a request to define metadata, or a request to register actual data and metadata in association with each other, the input detector 24 detects the kind of the request from this reference request. The user request detector 12 also has an input determining unit 26. The input determining unit 26 determines whether the kind of the request detected by the input detector 24 is a request to define metadata, or a request to register actual data and metadata in association with each other. If the kind of the request detected by the input detector 24 is a request to define metadata, the input determining unit 26 transmits an indication to define metadata to the metadata definition processor 14. If the kind of the request detected by the input detector 24 is a request to register actual data and metadata in association with each other, the input determining unit 26 transmits an indication to register actual data and metadata in association with each other to the display processor 18.

The metadata definition processor 14 has a generation/registration unit 28. When the generation/registration unit 28 receives an indication to define metadata, the generation/registration unit 28 defines multiple items of metadata based on user's operation of the operating unit 20, and defines and registers a structure of metadata including multiple sets of metadata items. The metadata definition processor 14 also has a data value defining unit 30. The data value defining unit 30 defines, based on user's operation of the operating unit 20, a set of data values corresponding to each set of metadata items included in the structure of metadata, for each individual set of metadata items. The defined set of metadata items, and the defined set of data values corresponding to the set of metadata items are used in registering actual data and metadata in association with each other.

The information management unit 16 has a metadata management unit 32 that manages the following sets of data defined by the metadata definition processor 14: multiple items of metadata, the structure of metadata, and the corresponding sets of data values. The metadata management unit 32 acquires the multiple metadata items defined by the metadata definition processor 14 from the metadata definition processor 14, and causes a metadata definition retaining unit 34 to retain the acquired metadata items.

The information management unit 16 also has the metadata definition retaining unit 34, and a metadata structure retaining unit 36. The metadata definition retaining unit 34 retains information indicating multiple defined items of metadata. The metadata structure retaining unit 36 retains information indicating a defined metadata structure, and information indicating the corresponding sets of data values. The metadata management unit 32 acquires information indicating the structure of metadata, and information indicating the corresponding sets of data values from the metadata definition processor 14, and causes the metadata structure retaining unit 36 to retain the acquired information.

Further, the information management unit 16 has an actual-data information retaining unit 42 that retains actual data along with an associated set of data values corresponding to each set of metadata items. The information management unit 16 also has a metadata information retaining unit 44 that retains information indicating an association between actual data, and a set of data values corresponding to each set of metadata items.

The display processor 18 has an actual-data processor 38. When the actual-data processor 38 receives an indication to register actual data and metadata in association with each other, the actual-data processor 38 causes the actual-data information retaining unit 42 to retain actual data along with an associated set of data values corresponding to each set of metadata items to thereby register the actual data. When a change is to be made to already registered actual data, or to a set of data values associated with actual data, the actual-data processor 38 reads the actual data from the actual-data information retaining unit 42, and displays the read actual data on the display 22.

The display processor 18 also has a metadata processor 40. When the metadata processor 40 receives an indication to register actual data and metadata in association with each other, the metadata processor 40 causes the metadata information retaining unit 44 to retain an association between actual data and a set of data values to thereby register the association between the actual data and the metadata. When a change is to be made to an already registered association between actual data and a set of data values, the metadata processor 40 reads the association between the actual data and the set of data values from the metadata information retaining unit 44, and displays the association on the display 22. When an association is established between actual data and metadata, the metadata processor 40 delivers actual data along with the associated set of data values to the actual-data processor 38.

Figure 2:
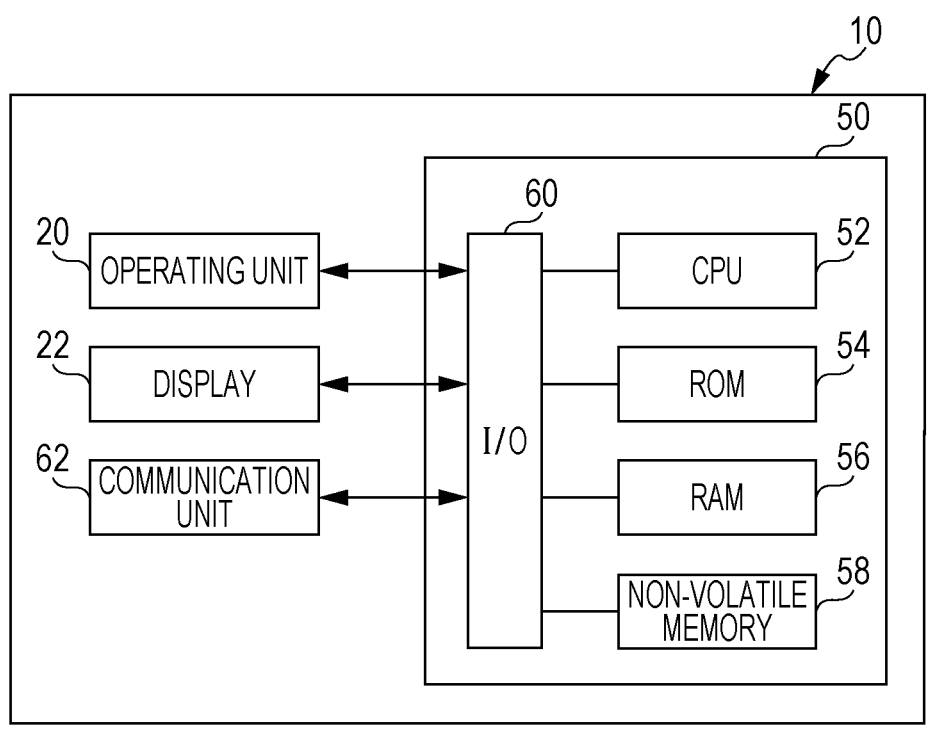
FIG. 2 is a block diagram illustrating the electrical configuration of an information processor according to an exemplary embodiment.

As illustrated in FIG. 2, the information processor 10 according to the first exemplary embodiment includes a controller that controls the overall operation of the information processor 10. The information processor 10 is implemented by the controller controlling various units of the information processor 10. A controller 50 includes a central processing unit (CPU) 52 that executes various processes described later, including a definition process, a data value setting process, and a registration process. The controller 50 also includes a read only memory (ROM) 54 that stores a program and various information used for processes executed by the CPU 52. The controller 50 also includes a random access memory (RAM) 56 that serves as a work area for the CPU 52 to temporarily store various data, and a non-volatile memory 58 that stores various information used for processes executed by the CPU 52. Further, the controller 50 includes an I/O interface 60 used to enter and output data to and from an external apparatus connected to the information processor 10. The I/O interface 60 is connected with the operating unit 20, the display 22, and a communication unit 62 that communicates with an external apparatus.

The non-volatile memory 58 stores various multiple files, such as document files, image files, video files, and music files. The following description of the first exemplary embodiment will be directed to a case in which an association between actual data and a set of data values corresponding to each set of metadata items is created for, among these files, a document file related to trading. The non-volatile memory 58 has the actual-data information retaining unit 42, the metadata information retaining unit 44, the metadata definition retaining unit 34, and the metadata structure retaining unit 36.

Figure 3:
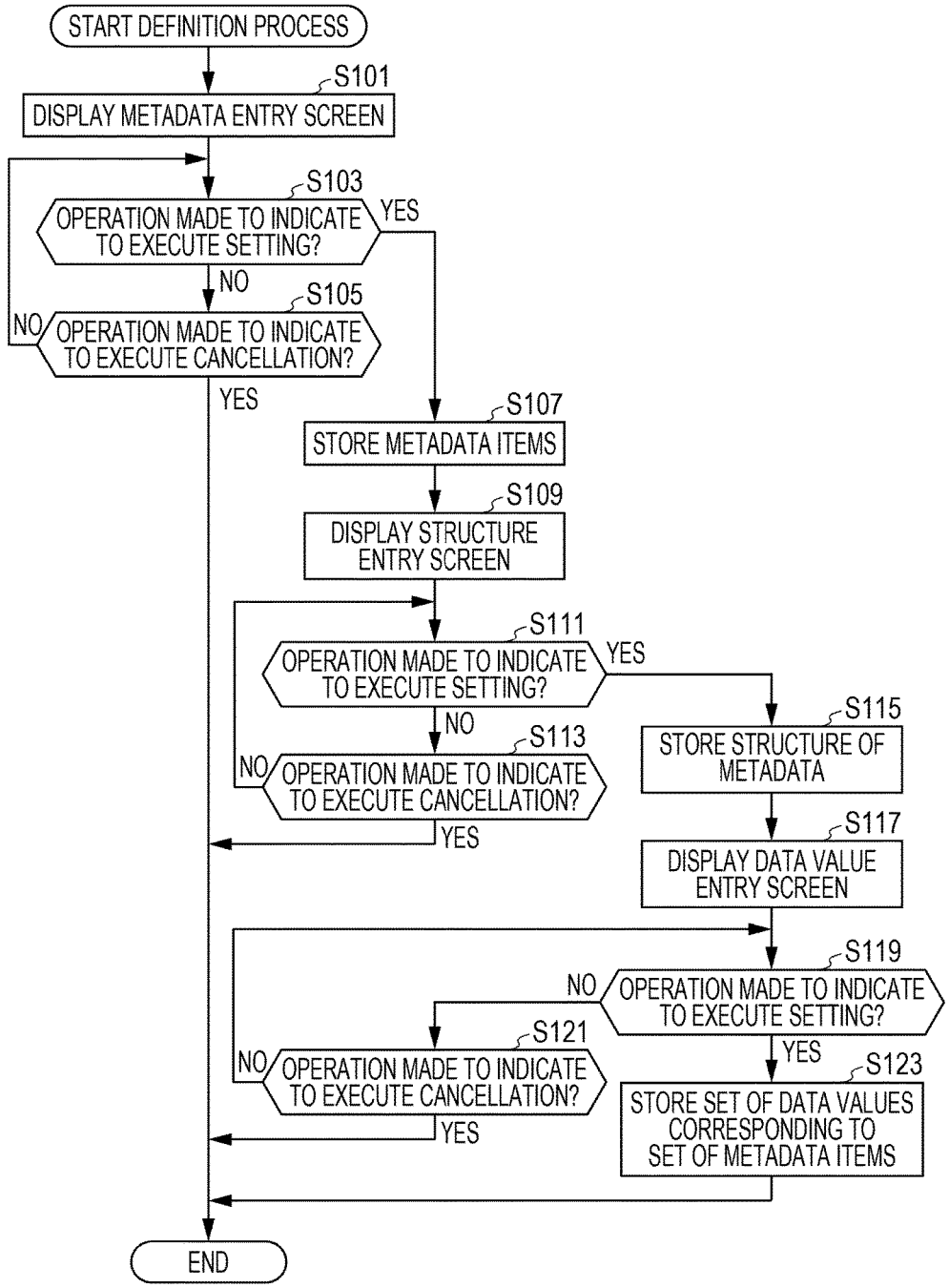
FIG. 3 is a flowchart of a program that executes a definition process according to an exemplary embodiment.

Now, the procedure for a definition process executed by the information processor 10 according to the first exemplary embodiment will be described with reference to the flowchart illustrated in FIG. 3.

Although a program that implements the definition process is stored in the non-volatile memory 58 in advance in the first exemplary embodiment, this is not to be construed in a limiting sense. For example, the program that implements the definition process may be received from an external apparatus via the communication unit 62 and executed. Alternatively, the program that implements the definition process recorded on a recording medium such as a CD-ROM may be read by, for example, a CD-ROM drive via the I/O interface 60 to thereby execute the definition process.

In the first exemplary embodiment, the program that implements a definition process is executed when the input detector 24 detects that a request to define metadata has been input by user's operation of the operating unit 20. However, the program may not necessarily be executed at this timing. For example, the program may be executed when a new file is stored into the non-volatile memory 58.

Figure 4:
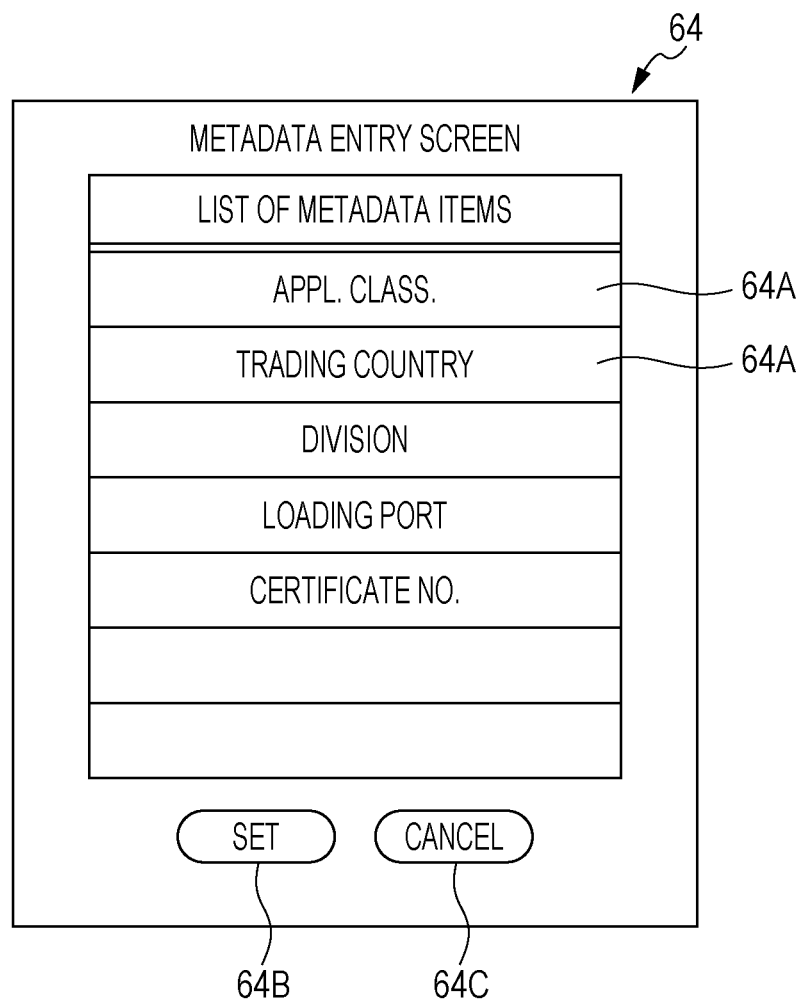
FIG. 4 schematically illustrates an example of a metadata entry screen according to an exemplary embodiment.

At step S101, the generation/registration unit 28 causes the display 22 to display a metadata entry screen used to enter metadata items. In one example, as illustrated in FIG. 4, a metadata entry screen 64 has entry fields 64A used to enter a metadata item, a Set button 64B used to indicate to set a metadata item, and a Cancel button 64C used to indicate to cancel the setting of a metadata item. The user operates the operating unit 20 to enter a metadata item into the entry field 64A, and then selects the Set button 64B or the Cancel button 64C.

At step S103, the generation/registration unit 28 determines whether an operation indicating to execute setting has been made by, for example, selecting the Set button 64B. If the generation/registration unit 28 determines at step S103 that an operation indicating to execute setting has been made (S103: Yes), the process transfers to step S107. If the generation/registration unit 28 determines at step S103 that an operation indicating to execute setting has not been made (S103: No), the process transfers to step S105.

At step S105, the generation/registration unit 28 determines whether an operation indicating to execute cancellation has been made by, for example, selecting the Cancel button 64C. If the generation/registration unit 28 determines at step S105 that an operation indicating to execute cancellation has been made (S105: Yes), the generation/registration unit 28 ends the displaying of the metadata entry screen 64, and also terminates the execution of the program that implements the definition process. If the generation/registration unit 28 determines at step S105 that an operation indicating to execute cancellation has not been made (S105: No), the process returns to step S103.

At step S107, the generation/registration unit 28 stores multiple metadata items entered in the individual entry fields 64A into the non-volatile memory 58. In the first exemplary embodiment, the generation/registration unit 28 delivers the multiple entered metadata items to the metadata management unit 32. The metadata management unit 32 retains the delivered multiple metadata items in the metadata definition retaining unit 34.

Figure 5:
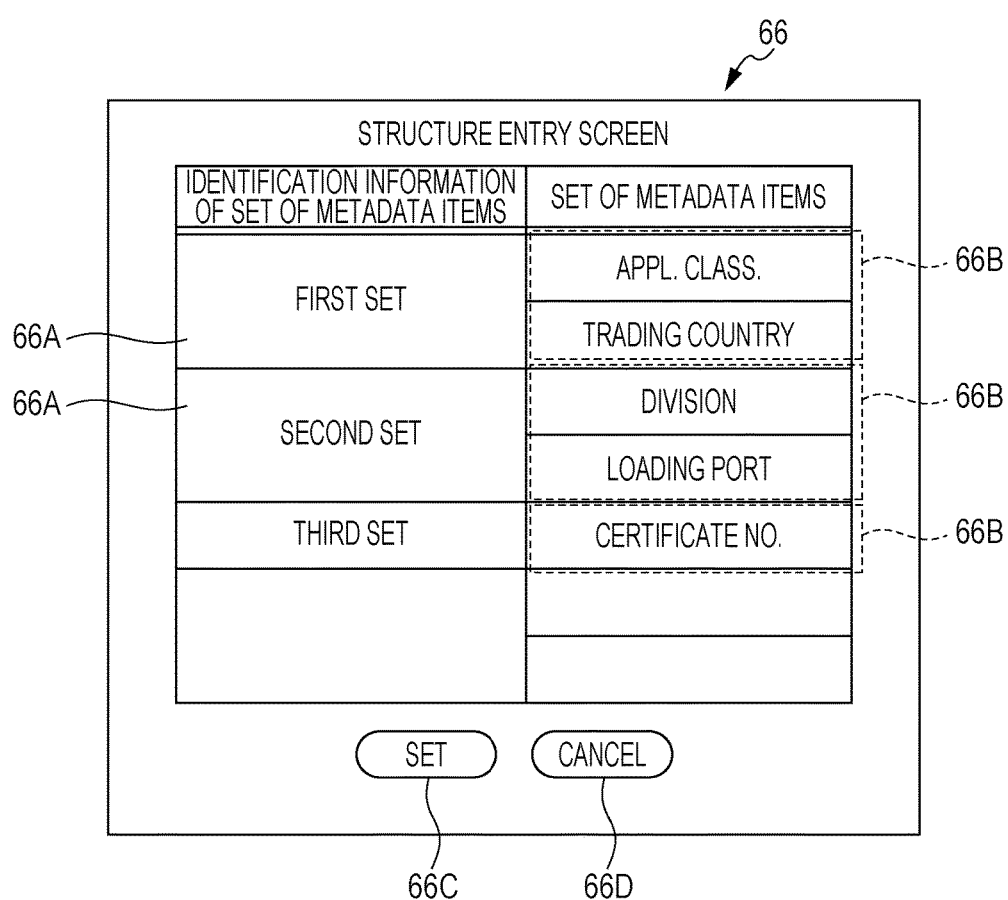
FIG. 5 schematically illustrates an example of a structure entry screen according to an exemplary embodiment.

At step S109, the generation/registration unit 28 causes the display 22 to display a structure entry screen used to enter the structure of metadata. In one example, as illustrated in FIG. 5, a structure entry screen 66 has entry fields 66A used to enter identification information of a set of metadata items, and entry fields 66B used to enter a set of metadata items. The structure entry screen 66 also has a Set button 66C used to indicate to set a metadata structure, and a Cancel button 66D used to indicate to cancel the setting of a metadata structure. The number of metadata items included in a set of metadata items is variable. Any number of such metadata items may be set for each individual set of metadata items in accordance with the number of metadata items desired to be registered in combination. When the user desires to define the structure of metadata, the user operates the operating unit 20, and enters identification information of each set of metadata items into the entry field 66A, enters each set of metadata items into the entry field 66B, and then selects the Set button 66C. When the user desires to cancel the definition of the structure of metadata, the user operates the operating unit 20 to select the Cancel button 66D.

At step S111, the generation/registration unit 28 determines whether an operation indicating to execute setting has been made by, for example, selecting the Set button 66C. If the generation/registration unit 28 determines at step S111 that an operation indicating to execute setting has been made (S111: Yes), the process transfers to step S115. If the generation/registration unit 28 determines at step S111 that an operation indicating to execute setting has not been made (S111: No), the process transfers to step S113.

At step S113, the generation/registration unit 28 determines whether an operation indicating to execute cancellation has been made by, for example, selecting the Cancel button 66D. If the generation/registration unit 28 determines at step S113 that an operation indicating to execute cancellation has been made (S113: Yes), the generation/registration unit 28 ends the displaying of the structure entry screen 66, and also terminates the execution of the program that implements the definition process. If the generation/registration unit 28 determines at step S113 that an operation indicating to execute cancellation has not been made (S113: No), the process returns to step S111.

At step S115, the generation/registration unit 28 stores, into the non-volatile memory 58, a metadata structure having each set of metadata items associated with entered identification information. In the first exemplary embodiment, the generation/registration unit 28 delivers the metadata structure to the metadata management unit 32. The metadata management unit 32 retains the delivered metadata structure in the metadata structure retaining unit 36.

At step S117, the data value defining unit 30 causes the display 22 to display a data value entry screen. In one example, as illustrated in FIG. 6, a data value entry screen 68 has entry fields 68A used to enter a set of data values corresponding to a set of metadata items. The data value entry screen 68 also has a Set button 68B used to indicate to set a metadata structure, and a Cancel button 68C used to indicate to cancel the setting of a metadata structure. The number of sets of data values corresponding to each individual set of metadata items is variable. Any number of such sets of data values may be set for each individual set of metadata items in accordance with the number of sets of data values that can be associated with actual data. When the user desires to set a set of data values, the user operates the operating unit 20, and enters a set of data values into the entry field 68A corresponding to a set of metadata items for which the user desires to set the set of data values, and then selects the Set button 68B. When the user desires to cancel the setting of a set of data values, the user operates the operating unit 20 to select the Cancel button 68C.

At step S119, the generation/registration unit 28 determines whether an operation indicating to execute setting has been made by, for example, selecting the Set button 68B. If the generation/registration unit 28 determines at step S119 that an operation indicating to execute setting has been made (S119: Yes), the process transfers to step S123. If the generation/registration unit 28 determines at step S119 that an operation indicating to execute setting has not been made (S119: No), the process transfers to step S121.

At step S121, the data value defining unit 30 determines whether an operation indicating to execute cancellation has been made by, for example, selecting the Cancel button 68C. If the data value defining unit 30 determines at step S121 that an operation indicating to execute cancellation has been made (S121: Yes), the data value defining unit 30 ends the displaying of the data value entry screen 68, and also terminates the execution of the program that implements the definition process. If the data value defining unit 30 determines at step S121 that an operation indicating to execute cancellation has not been made (S121: No), the process returns to step S119.

At step S123, the data value defining unit 30 stores a set of data values corresponding to a set of metadata items into the non-volatile memory 58. Further, the data value defining unit 30 ends the displaying of the data value entry screen 68, and also terminates the execution of the program that implements the definition process. In the first exemplary embodiment, the data value defining unit 30 delivers the entered set of data values to the metadata management unit 32. The metadata management unit 32 retains the delivered set of data values in the metadata structure retaining unit 36.

Figure 7:
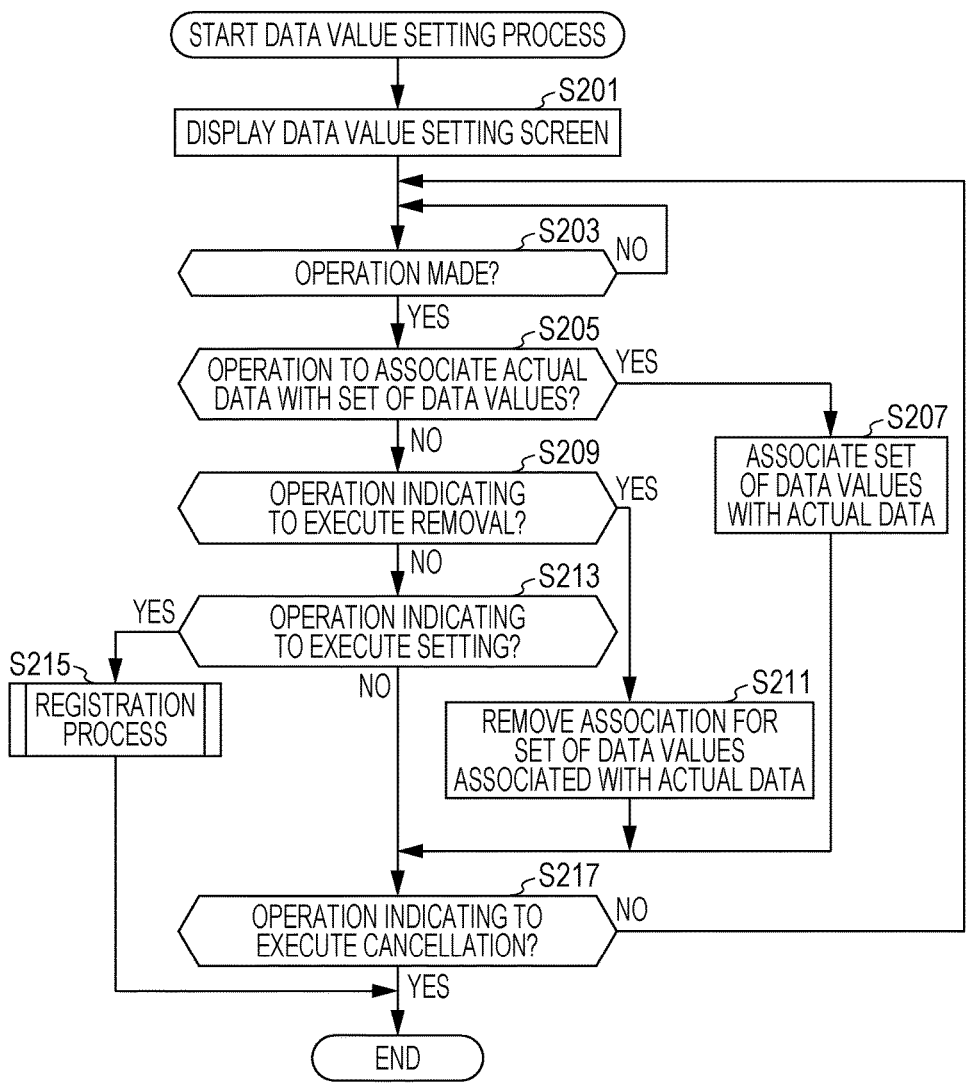
FIG. 7 is a flowchart of a program that executes a data value setting process according to a first exemplary embodiment.

Now, the procedure for a data value setting process executed by the information processor 10 according to the first exemplary embodiment will be described with reference to the flowchart illustrated in FIG. 7.

Although a program that implements the data value setting process is stored in the non-volatile memory 58 in advance in the first exemplary embodiment, this is not to be construed in a limiting sense. For example, the program that implements the data value setting process may be received from an external apparatus via the communication unit 62 and executed. Alternatively, the program that implements the data value setting process recorded on a recording medium such as a CD-ROM may be read by, for example, a CD-ROM drive via the I/O interface 60 to thereby execute the data value setting process.

In the first exemplary embodiment, the program that implements the data value setting process is executed when the input detector 24 detects that a request to register actual data and metadata in association with each other has been input through user's operation of the operating unit 20. However, the program may not necessarily be executed at this timing. For example, the program may be executed when a new file is stored into the non-volatile memory 58.

Figure 8:
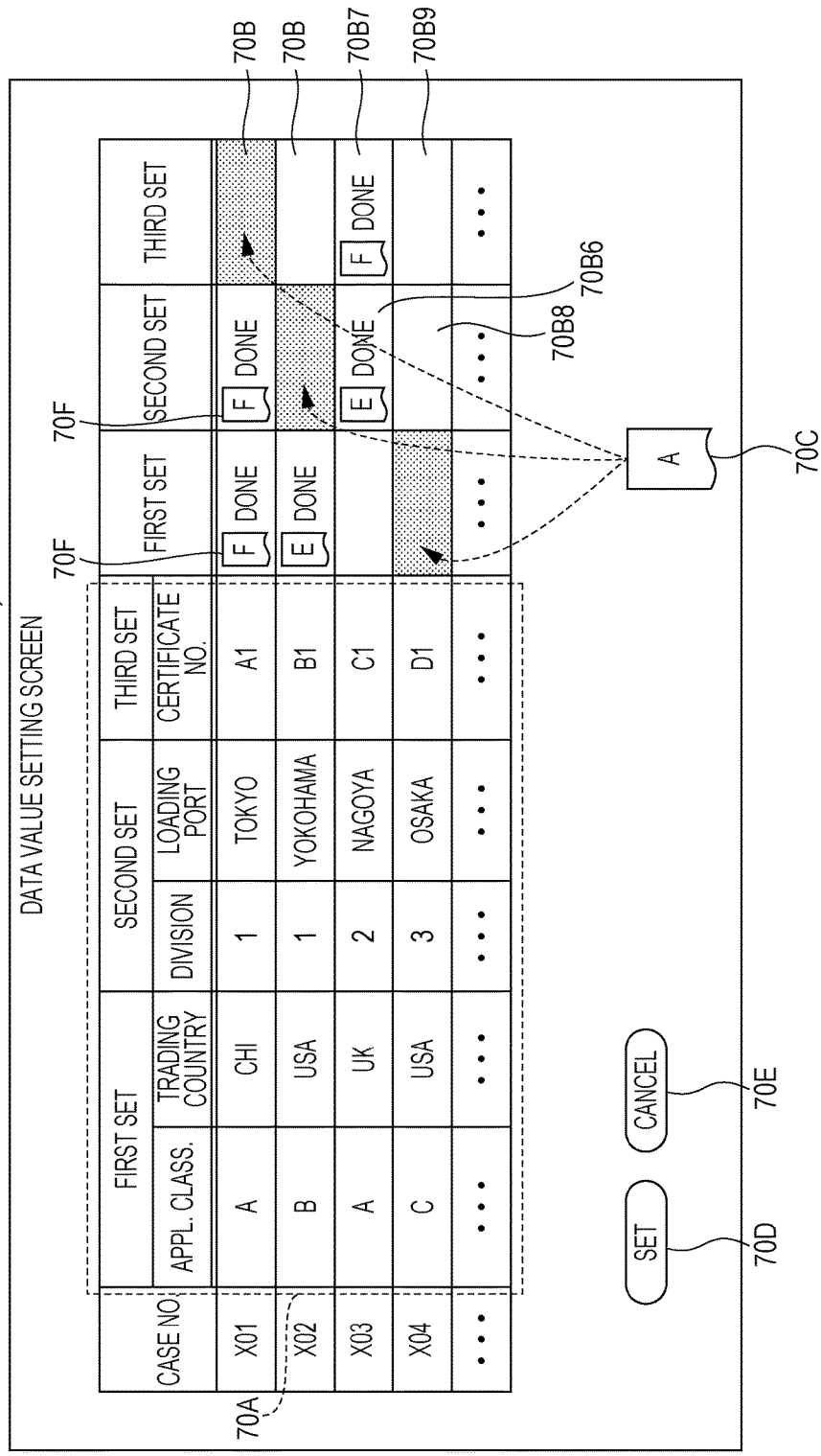
FIG. 8 schematically illustrates an example of a data value setting screen according to the first exemplary embodiment.

At step S201, the metadata processor 40 causes the display 22 to display a data value setting screen used to set an association between actual data and a set of data values. In one example, as illustrated in FIG. 8, a data value setting screen 70 has a display field 70A, and multiple specifying areas 70B. The display field 70A displays defined sets of data values for individual sets of metadata items. Each of the specifying areas 70B, for which a set of data values is defined, specifies the actual data to be associated with the defined set of data values. The data value setting screen 70 also has an icon image 70C that represents identification information of actual data. The data value setting screen 70 also has a Set button 70D used to indicate to set an association between actual data and a set of data values, and a Cancel button 70E used to indicate to cancel the setting of an association between actual data and a set of data values. In the display field 70A, each set of metadata items is displayed in a first direction (horizontal direction), and each set of data values corresponding to a set of metadata items is displayed in a second direction (vertical direction) that crosses the first direction. The specifying areas 70B are arrayed and displayed in grid form in a manner corresponding to information displayed in the display field 70A, so that each set of metadata items is defined in the first direction, and each set of data values corresponding to a set of metadata items is defined in the second direction.

The user looks at the display field 70A, and operates the operating unit 20 to move the display position of the icon image 70C to a position inside one of the specifying areas 70B, thus associating Actual Data A represented by the icon image 70C with a set of data values defined for the corresponding specifying area 70B. The display position of the icon image 70C refers to, for example, the position of the center of gravity of the icon image 70C. When a mouse is to be used to execute an association, suppose that, for example, the mouse is left-clicked, and while holding down the left click, the display position of the icon image 70C is moved to a position inside the specifying areas 70B and then the left click is released. In this case, an association is established between actual data represented by the icon image 70C, and a set of data values defined for the specifying area 70B in which the moved icon image 70C is located, at the time when the left click is released. After the association is established, the display position of the icon image 70C is returned to the original display position. The user performs the above operation multiple times to associate multiple sets of data values with actual data.

Figure 9:
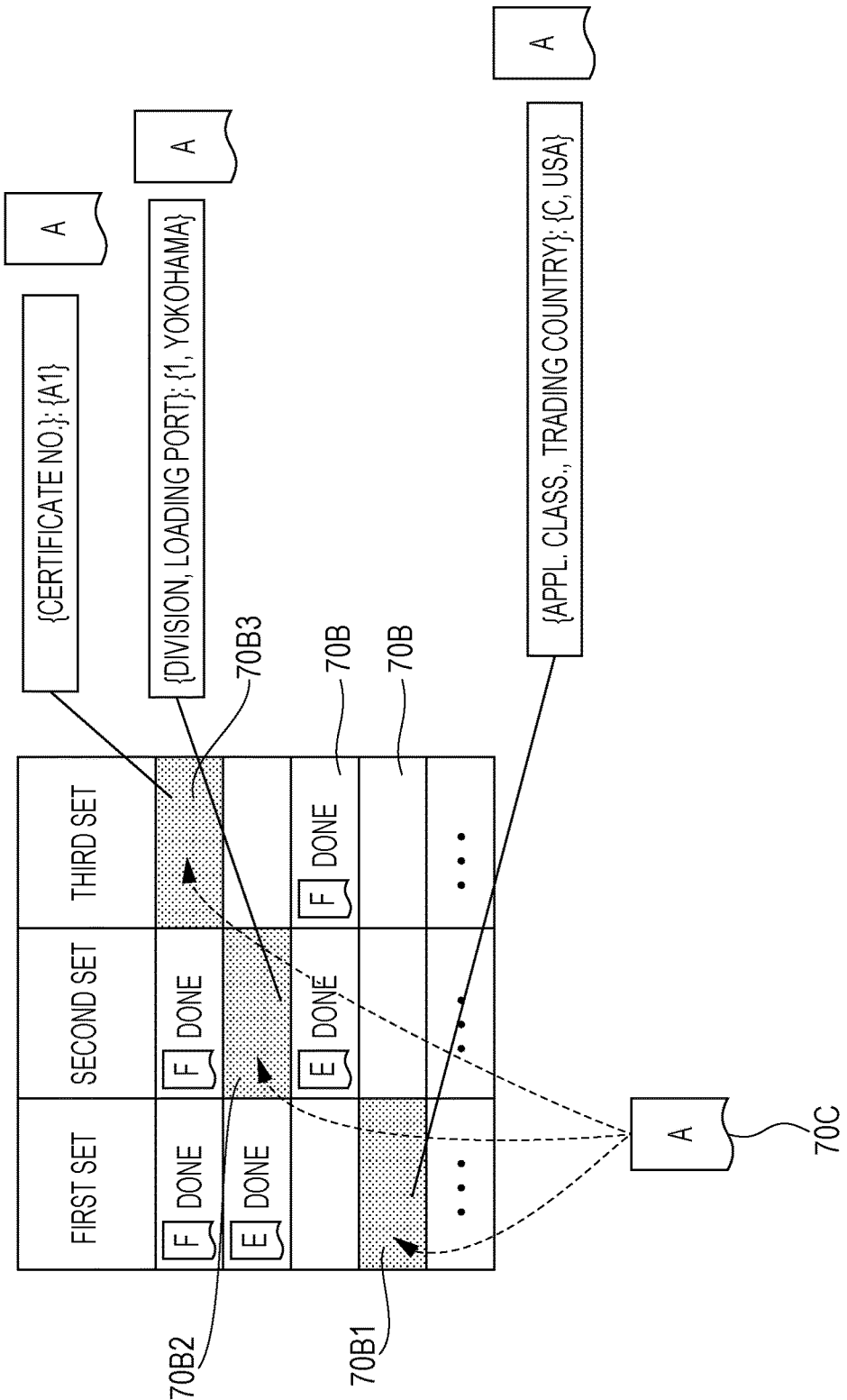
FIG. 9 schematically illustrates an example of sets of data values defined for specifying areas on the data value setting screen according to the first exemplary embodiment.

For example, suppose that, as illustrated in FIG. 9, the display position of the icon image 70C representing Actual Data A is moved to a position inside a specifying area 70B1 for which the set of data values {Application Classification (to be abbreviated as "Appl. No." hereinafter), Trading Country}:{C, USA} is defined. In this case, an association is established between Actual Data A and the following set of data values: {Case No., Appl. Class., Trading Country}: {X04, C, USA}, which has case number added as a metadata item to the set of data values defined for the specifying area 70B1. Further, suppose that the display position of the icon image 70C representing Actual Data A is moved to a position inside a specifying area 70B2 for which the set of data values {Division, Loading Port}:{1, Yokohama} is defined. In this case, an association with Actual Data A is created for the following set of data values: {Case No., Division, Loading Port}:{X02, 1, Yokohama}, which has case number added as a metadata item to the set of data values defined for the specifying area 70B2. Further, suppose that the display position of the icon image 70C representing Actual Data A is moved to a position inside a specifying area 70B3 for which the set of data values {Certificate No.}:{A1} is defined. In this case, an association with Actual Data A is created for the following set of data values: {Case No., Certificate No.}:{X01, A1}, which has case number added as a metadata item to the set of data values defined for the specifying area 70B3. Case number in the first exemplary embodiment is a serial number given to each individual row in the display field 70A.

In one example, as illustrated in FIG. 8, identification information 70F of actual data associated with a set of data values defined for the specifying area 70B is displayed in the specifying area 70B. The user looks at the identification information 70F of actual data displayed in the specifying area 70B, and operates the operating unit 20 to remove the association between the actual data and the set of data values. When a mouse is to be used to remove the association, suppose that, for example, a mouse cursor is placed over the position where the identification information 70F of actual data is displayed in the specifying area 70B, and a double click is performed. In this case, the association between the actual data represented by the identification information 70F and the set of data values defined for the specifying area 70B is removed at the time when the double click is performed. Further, the displaying of the identification information 70F in the specifying area 70B is stopped at the time when the association is removed.

When the user desires to set an association between actual data and a set of data values corresponding to a set of metadata items, the user operates the operating unit 20 to select the Set button 70D. When the user desires to cancel the setting of an association between actual data and a set of data values corresponding to a set of metadata items, the user operates the operating unit 20 to select the Cancel button 70E.

In the first exemplary embodiment, the display field 70A that displays a defined set of data values for each individual set of metadata items is displayed on the data value setting screen 70 together with the specifying areas 70B. However, this is not to be construed in a limiting sense. For example, a set of data values defined for each of the specifying areas 70B may be displayed in the specifying area 70B.

In the first exemplary embodiment, an association between actual data and a set of data values is created by moving the display position of the icon image 70C to a position inside the specifying area 70B. However, an association between actual data and a set of data values may not necessarily be created in this way. For example, an association between actual data and a set of data values may be created by entering information related to the actual data into the specifying area 70B with a keyboard.

At step S203, the metadata processor 40 determines whether some operation has been made on the operating unit 20. If it is determined at step S203 that some operation has been made (S203: Yes), the process transfers to step S205. If it is determined at step S203 that no operation has been made (S203: No), the process waits until some operation is made on the operating unit 20.

At step S205, the metadata processor 40 determines whether the detected operation is an operation indicating to associate actual data with a set of data values which is made by, for example, moving the display position of the icon image 70C representing identification information of actual data to a position inside the specifying area 70B. If it is determined at step S205 that the detected operation is an operation indicating to associate actual data with a set of data values (S205: Yes), the process transfers to step S207. If it is determined at step S205 that the detected operation is not an operation indicating to associate actual data with a set of data values (S205: No), the process transfers to step S209.

At step S207, the metadata processor 40 associates actual data with a specified set of data values. In the first exemplary embodiment, as described above, Actual Data A represented by the moved icon image 70C is associated with a set of data values defined for the specifying area 70B. Further, the metadata processor 40 displays, in the specifying area 70B, the identification information of the actual data associated with the set of data values defined for the specifying area 70B.

At step S209, the metadata processor 40 determines whether the detected operation is an operation indicating to remove the association of a set of data values with actual data. If it is determined at step S209 that the detected operation is an operation indicating to remove the association between actual data and a set of data values (S209: Yes), the process transfers to step S211. If it is determined at step S209 that the detected operation is not an operation indicating to remove the association between actual data and a set of data values (S209: No), the process transfers to step S213.

At step S211, the metadata processor 40 removes the association between actual data and a set of data values for which an indication to remove the association has been given.

At step S213, the metadata processor 40 determines whether the detected operation is an operation indicating to execute setting which is made by, for example, selecting the Set button 70D. If it is determined at step S213 that the detected operation is an operation indicating to execute setting (S213: Yes), the process transfers to step S215. If it is determined at step S213 that the detected operation is not an operation indicating to execute setting (S213: No), the process transfers to step S217.

At step S215, the metadata processor 40 ends the execution of the program that implements the data value setting process, after executing a registration process described later.

At step S217, the metadata processor 40 determines whether the detected operation is an operation indicating to execute cancellation which is made by, for example, selecting the Cancel button 70E. If it is determined at step S217 that the detected operation is an operation indicating to execute cancellation (S217: Yes), the displaying of the data value setting screen 70 is ended, and the execution of the program that implements the data value setting process is terminated. If it is determined at step S217 that the detected operation is not an operation indicating to execute cancellation (S217: No), the process returns to step S203.

Figure 10:
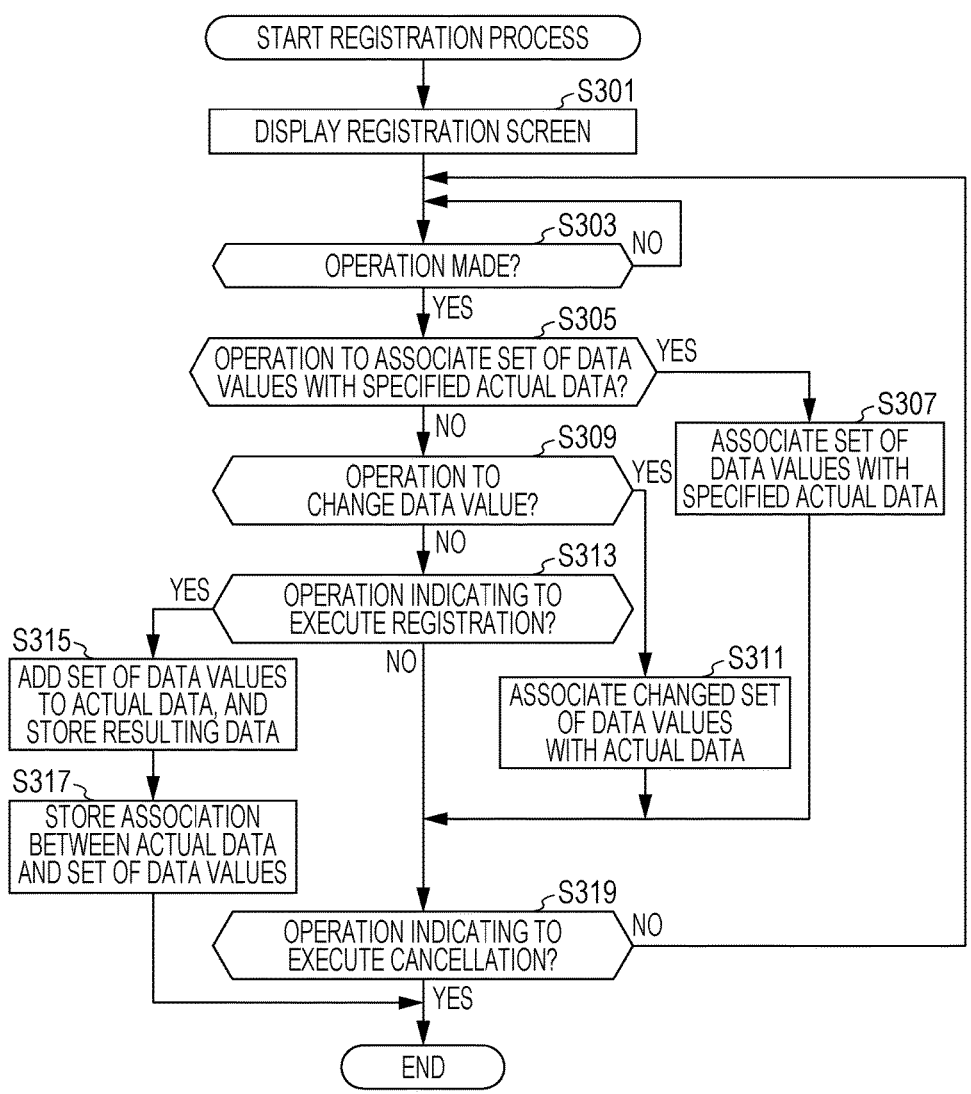
FIG. 10 is a flowchart of a program that executes a registration process according to an exemplary embodiment.

Now, the procedure for a registration process executed by the information processor 10 according to the first exemplary embodiment will be described with reference to the flowchart illustrated in FIG. 10.

Although a program that implements the registration process is stored in the non-volatile memory 58 in advance in the first exemplary embodiment, this is not to be construed in a limiting sense. For example, the program that implements the registration process may be received from an external apparatus via the communication unit 62 and executed. Alternatively, the program that implements the registration process recorded on a recording medium such as a CD-ROM may be read by, for example, a CD-ROM drive via the I/O interface 60 to thereby execute the registration process.

Figure 11A:
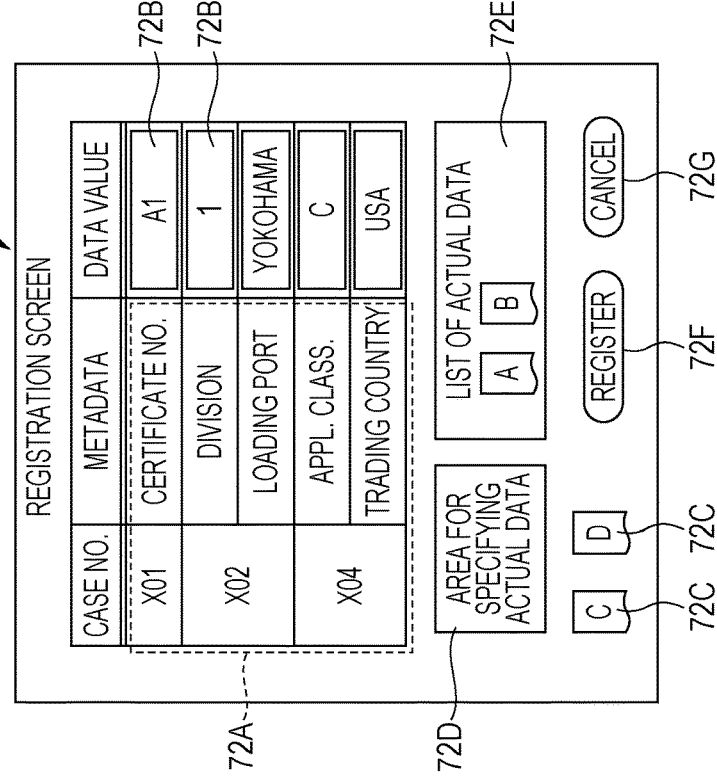
FIG. 11A schematically illustrates an example of a registration screen before being changed according to the first exemplary embodiment.

At step S301, the metadata processor 40 causes the display 22 to display a registration screen used to register an association between actual data and a set of data values. In one example, as illustrated in FIG. 11A, a registration screen 72 has a display field 72A that displays a set of metadata items set for each individual case number, and display/entry fields 72B used to display and enter a set of data values set for each individual case number. The registration screen 72 also has multiple icon images 72C each representing identification information of actual data. The registration screen 72 also has a specifying area 72D for specifying the actual data to be associated with a set of data values that has been set. The registration screen 72 also has a display field 72E that displays a list of actual data associated with a set of data values that has been set. The registration screen 72 also has a Register button 72F used to indicate to register an association between actual data and a set of data values, and a Cancel button 72G used to indicate to cancel the setting of an association between actual data and a set of data values.

The user looks at the display field 72A, and operates the operating unit 20 to change a data value displayed in the display/entry field 72B. Further, the user operates the operating unit 20 to move the display position of the icon image 72C to a position inside the specifying area 72D, thus associating actual data represented by the icon image 72C with a set of data values defined for the corresponding display/entry field 72B.

When a mouse is to be used to execute an association, for example, after the display position of the icon image 72C is moved to a position inside the specifying area 72D while holding down a left click on the mouse, the association is executed at the time when the left click is released, and then the display position of the icon image 72C is returned to the original display position. Associating multiple sets of data values with actual data is done by the user performing the above process multiple times.

Figure 11B:
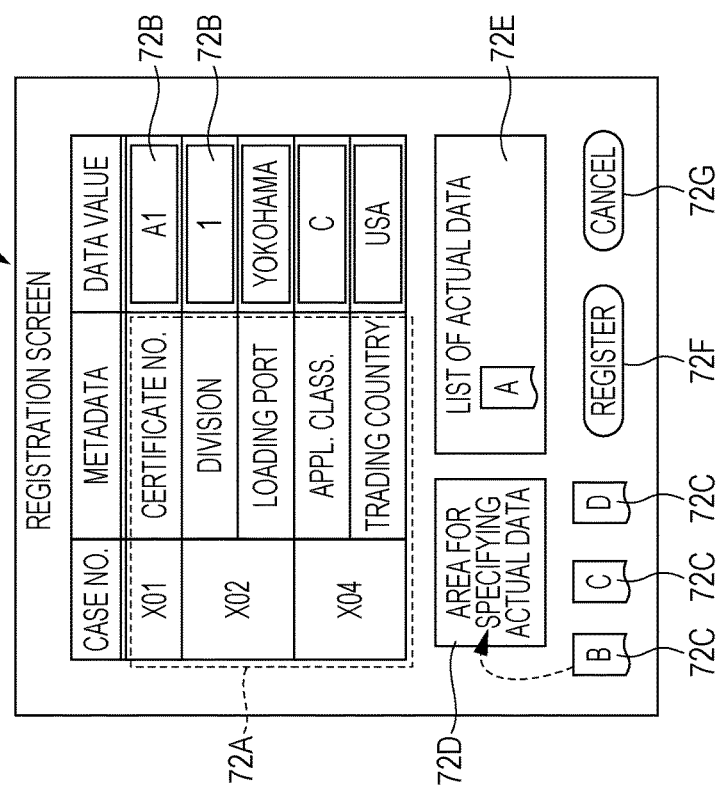
FIG. 11B schematically illustrates an example of a registration screen after being changed according to the first exemplary embodiment.

For example, when the icon image 72C representing Actual Data B is moved to a position inside the specifying area 72D, as illustrated in FIG. 11B, for example, the icon image 72C representing Actual Data B is displayed in the display field 72E. At this time, an association is established between Actual Data B and a set of data values displayed in the display/entry field 72B.

At step S303, the metadata processor 40 determines whether some operation has been made on the operating unit 20. If it is determined at step S303 that some operation has been made (S303: Yes), the process transfers to step S305. If it is determined at step S303 that no operation has been made (S303: No), the process waits until some operation is made on the operating unit 20.

At step S305, the metadata processor 40 determines whether the detected operation is an operation indicating to associate specified actual data with a set of data values which is made by, for example, moving the display position of the icon image 72C representing identification information of actual data to a position inside the specifying area 72D. If it is determined at step S305 that the detected operation is an operation indicating to associate specified actual data with a set of data values (S305: Yes), the process transfers to step S307. If it is determined at step S305 that the detected operation is not an operation indicating to associate specified actual data with a set of data values (S305: No), the process transfers to step S309.

At step S307, the metadata processor 40 associates actual data with a set of data values displayed in the display/entry field 72B. In the first exemplary embodiment, as described above, Actual Data B represented by the moved icon image 72C is associated with a set of data values defined for the display/entry field 72B. Further, the metadata processor 40 displays, in the display field 72E, the icon image 72C representing Actual Data B that has been specified.

At step S309, the metadata processor 40 determines whether the detected operation is an operation to change a data value performed by, for example, changing a data value displayed in the display/entry field 72B. If it is determined at step S309 that the detected operation is an operation to change a data value (S309: Yes), the process transfers to step S311. If it is determined at step S309 that the detected operation is not an operation to change a data value (S309: No), the process transfers to step S313.

At step S311, the metadata processor 40 associates the changed set of data values with actual data.

At step S313, the metadata processor 40 determines whether the detected operation is an operation indicating to execute registration which is made by, for example, selecting the Register button 72F. If it is determined at step S313 that the detected operation is an operation indicating to execute registration (S313: Yes), the process transfers to step S315. If it is determined at step S313 that the detected operation is not an operation indicating to execute registration (S313: No), the process transfers to step S319.

At step S315, the metadata processor 40 adds a set of data values to actual data, and stores the resulting data. In the first exemplary embodiment, an association is created between each of Actual Data A and Actual Data B represented by the icon image 72C displayed in the display field 72E, and a set of data values displayed in the display/entry field 72B. Then, the metadata processor 40 delivers each of Actual Data A and Actual Data B along with the associated set of data values to the actual-data processor 38. The actual-data processor 38 causes the actual-data information retaining unit 42 to retain the received Actual Data A and Actual Data B.

Figure 12:
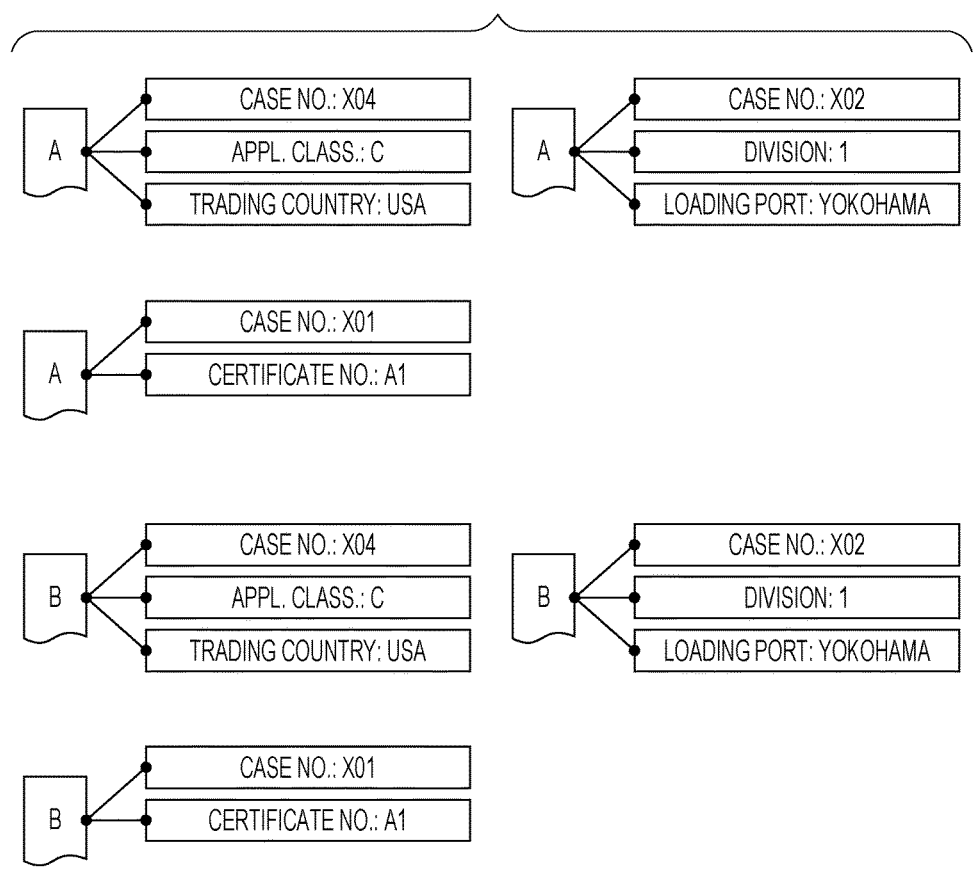
FIG. 12 schematically illustrates an example of metadata information according to the first exemplary embodiment.

At step S317, the metadata processor 40 causes the association between actual data and a set of data values to be stored. In the first exemplary embodiment, the metadata processor 40 causes the metadata information retaining unit 44 to store, for each individual set of data values, an association made by associating each of Actual Data A and Actual Data B represented by the icon image 72C displayed in the display field 72E, with each set of data values displayed in the display/entry field 72B. In one example, as illustrated in FIG. 12, an association made by associating Actual Data A with the three sets of data values {Case No.: X04}, {Appl. Class.: C}, and {Trading Country: USA} is stored. Further, an association made by associating Actual Data A with the three sets of data values {Case No.: X02}, {Division: 1}, and {Loading Port: Yokohama} is stored. Furthermore, an association made by associating Actual Data A with the two sets of data values {Case No.: X01} and {Certificate No.: A1} is stored. For Actual Data B, like Actual Data A, an association created by associating Actual Data B with each of the sets of data values mentioned above is also stored.

Figure 13:
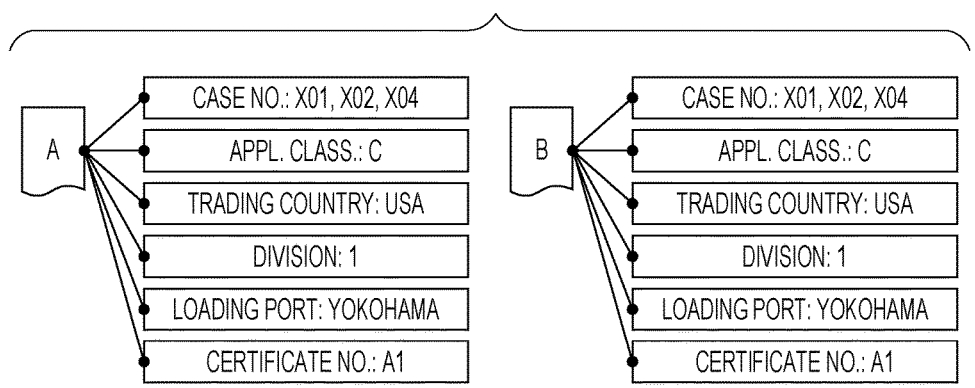
FIG. 13 schematically illustrates another example of metadata information according to the first exemplary embodiment.

An association between actual data and each set of data values may not necessarily be stored in the manner mentioned above. For example, the metadata information retaining unit 44 may be made to store an association made by associating, for each individual metadata item, each data value displayed in the display/entry field 72B with each of Actual Data A and Actual Data B represented by the icon image 72C displayed in the display field 72E. In one example, as illustrated in FIG. 13, an association of Actual Data A with the following six sets of data values is stored: {Case No.: X01, X02, X04}, {Appl. Class.: C}, {Trading Country: USA}, {Division: 1}, {Loading Port: Yokohama}, and {Certificate No.: A1}. For Actual Data B, like Actual Data A, an association of Actual Data B with each of the sets of data values mentioned above is also stored.

Figure 14:
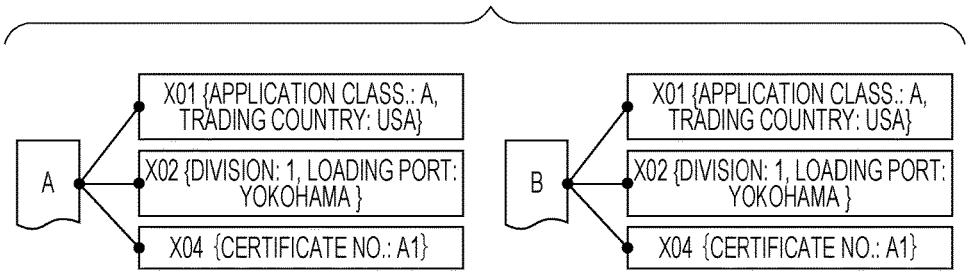
FIG. 14 schematically illustrates still another example of metadata information according to the first exemplary embodiment.

Alternatively, the metadata information retaining unit 44 may be made to store, for each individual case number, an association made by associating each data value displayed in the display/entry field 72B with each of Actual Data A and Actual Data B represented by the icon image 72C displayed in the display field 72E. In one example, as illustrated in FIG. 14, an association of Actual Data A with the following three sets of data values is stored: X01{Appl. Class.: A, Trading Country: USA}, X02{Division: 1, Loading Port: Yokohama}, and X04{Certificate No.: A1}. For Actual Data B, like Actual Data A, an association of Actual Data B with each of the sets of data values mentioned above is stored.

Three different manners of storing an association between actual data and each set of data values have been described above with reference to FIGS. 12 to 14. In this regard, an association between actual data and each set of data values may be stored in advance in each of these manners. In this case, to search for a file based on the data value of metadata from among multiple files stored in the non-volatile memory 58, the search may be performed by using an association between actual data and a set of data values that is stored in a manner suited for the search method.

In one example, as illustrated in FIG. 15, an association between actual data and a set of data values may be set on the data value setting screen illustrated in FIG. 8 and stored in that state. Reference information for actual data may be represented in any form, such as a file path 76A to the actual content file, a search condition 76B for a piece of content on the system, or a URL 76C to a piece of content on the system.

Second Exemplary Embodiment

Next, an information processor according to a second exemplary embodiment will be described.

The first exemplary embodiment is directed to a case in which one set of the data values of metadata is set for each one specifying area. The second exemplary embodiment described below is directed to a case where multiple sets of data values corresponding to multiple sets of metadata items are defined for each merged specifying area including multiple specifying areas that are merged together.

Since the information processor according to the second exemplary embodiment is configured in the same manner as the information processor 10 according to the first exemplary embodiment, a description of its individual components will be omitted.

The information processor 10 according to the second exemplary embodiment performs a definition process first. Since this definition process is performed in the same manner as the definition process in the first exemplary embodiment, a description of this definition process is omitted here.

Figure 16:
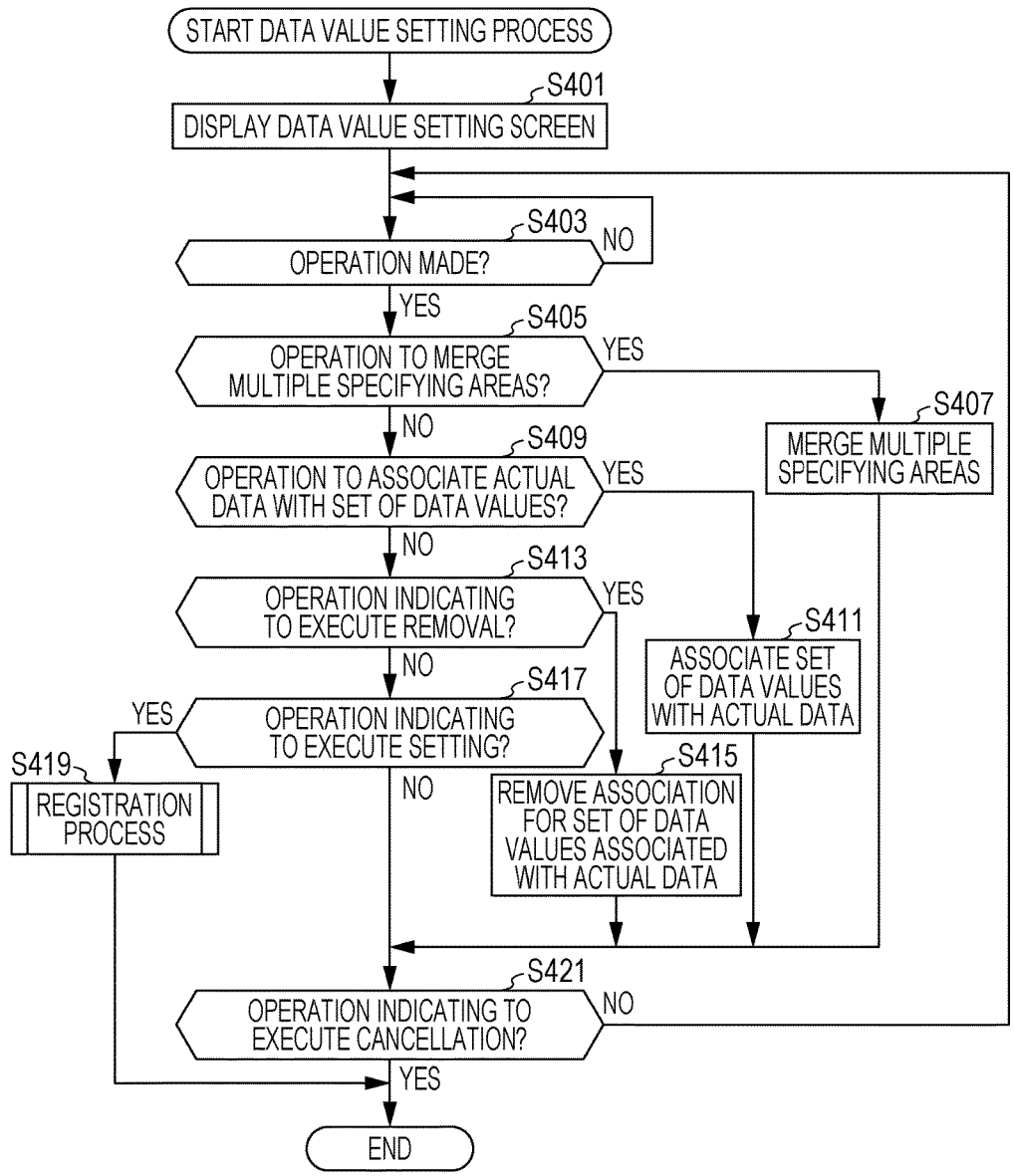
FIG. 16 is a flowchart of a program that executes a data value setting process according to a second exemplary embodiment.

Now, the procedure for a data value setting process executed by the information processor 10 according to the second exemplary embodiment will be described with reference to the flowchart illustrated in FIG. 16.

Although a program that implements the data value setting process is stored in the non-volatile memory 58 in advance in the second exemplary embodiment, this is not to be construed in a limiting sense. For example, the program that implements the data value setting process may be received from an external apparatus via the communication unit 62 and executed. Alternatively, the program that implements the data value setting process recorded on a recording medium such as a CD-ROM may be read by, for example, a CD-ROM drive via the I/O interface 60 to thereby execute the data value setting process.

In the second exemplary embodiment, the program that implements the data value setting process is executed when the input detector 24 detects that a request for reference to metadata has been input through user's operation of the operating unit 20. However, the program may not necessarily be executed at this timing. For example, the program may be executed when a new file is stored into the non-volatile memory 58.

At step S401, as at step S201, the metadata processor 40 causes the display 22 to display the data value setting screen 70 (see FIG. 8) used to set an association between actual data and a set of data values.

At step S403, as at step S203, the metadata processor 40 determines whether some operation has been made on the operating unit 20. If it is determined at step S403 that some operation has been made (S403: Yes), the process transfers to step S405. If it is determined at step S403 that no operation has been made (S403: No), the process waits until some operation is made on the operating unit 20.

At step S405, the metadata processor 40 determines whether the detected operation is an operation indicating to merge multiple specifying areas 70B which is made by, for example, specifying multiple specifying areas 70B. If it is determined at step S405 that the detected operation is an operation indicating to merge multiple specifying areas 70B (S405: Yes), the process transfers to step S407. If it is determined at step S405 that the detected operation is not an operation indicating to merge multiple specifying areas 70B (S405: No), the process transfers to step S409.

At step S407, the metadata processor 40 merges multiple specifying areas 70B. In one example, as illustrated in FIG. 17, when the detected operation is an operation indicating to merge a specifying area 70B4 and a specifying area 70B5, the specifying area 70B4 and the specifying area 70B5 are merged into a merged specifying area 78A. When the detected operation is an operation indicating to merge a specifying area 70B6, a specifying area 70B7, a specifying area 70B8, and a specifying area 70B9, the specifying area 70B6, the specifying area 70B7, the specifying area 70B8, and the specifying area 70B9 are merged into a merged specifying area 78B. At this time, a set of data values defined for the specifying area 70B4, and a set of data values defined for the specifying area 70B5 are defined for the merged specifying area 78A. A set of data values defined for the specifying area 70B6, a set of data values defined for the specifying area 70B7, a set of data values defined for the specifying area 70B8, and a set of data values defined for the specifying area 70B9 are defined for the merged specifying area 78B.

At step S409, as at step S205, the metadata processor 40 determines whether the detected operation is an operation indicating to associate actual data with a set of data values which is made by, for example, moving the display position of the icon image 70C representing identification information of actual data to a position inside the specifying area 70B. If it is determined at step S409 that the detected operation is an operation indicating to associate actual data with a set of data values (S409: Yes), the process transfers to step S411. If it is determined at step S409 that the detected operation is not an operation indicating to associate actual data with a set of data values (S409: No), the process transfers to step S413.

At step S411, as at step S207, the metadata processor 40 associates actual data with a specified set of data values. In the second exemplary embodiment, as described above, Actual Data A represented by the moved icon image 70C is associated with a set of data values defined for the specifying area 70B. If the icon image 70C is moved to the merged specifying area 78A (or the merged specifying area 78B), Actual Data A represented by the moved icon image 70C is associated with each of the sets of data values defined for the merged specifying area 78A (or the merged specifying areas 78B).

At step S413, as at step S209, the metadata processor 40 determines whether the detected operation is an operation indicating to remove an association between actual data and a set of data values associated with the actual data. If it is determined at step S413 that the detected operation is an operation indicating to remove an association between actual data and a set of data values (S413: Yes), the process transfers to step S415. If it is determined at step S413 that the detected operation is not an operation indicating to remove an association between actual data and a set of data values (S413: No), the process transfers to step S417.

At step S415, as at step S211, the metadata processor 40 removes an association between actual data and a set of data values for which an indication to remove the association has been given.

At step S417, as at step S213, the metadata processor 40 determines whether the detected operation is an operation indicating to execute setting which is made by, for example, selecting the Set button 70D. If it is determined at step S417 that the detected operation is an operation indicating to execute setting (S417: Yes), the process transfers to step S419. If it is determined at step S417 that the detected operation is not an operation indicating to execute setting (S417: No), the process transfers to step S421.

At step S419, as at step S215, the metadata processor 40 terminates the execution of the program that implements the data value setting process, after executing the registration process mentioned above.

At step S421, as at step S217, the metadata processor 40 determines whether the detected operation is an operation indicating to execute cancellation which is made by, for example, selecting the Cancel button 70E. If it is determined at step S421 that the detected operation is an operation indicating to execute cancellation (S421: Yes), the displaying of the data value setting screen 70 is ended, and the execution of the program that implements the data value setting process is terminated. If it is determined at step S421 that the detected operation is not an operation indicating to execute cancellation (S421: No), the process returns to step S403.

As described above, the information processor 10 according to the second exemplary embodiment merges multiple specifying areas 70B specified by the user into the merged specifying area 78A or 78B, and defines, for the merged specifying area 78A or 78B, the set of data values defined for each of the individual specifying areas 70B that have been merged together. If the icon image 70C is moved to the merged specifying area 78A or 78B including multiple specifying areas 70B that have been merged together, the sets of data values defined for the merged specifying area 78A or 78B are associated with the actual data represented by the icon image 70C.

After the data value setting process mentioned above, the information processor 10 according to the second exemplary embodiment continues to proceed to a registration process. Since this registration process is similar to the registration process described above with reference to the first exemplary embodiment, a description of this registration process is omitted here.

When the registration process is to be performed following the data value setting process, as illustrated in FIG. 18A, for example, each set of data values individually defined for each of the multiple specifying areas 70B that have been merged together is displayed in the display/entry field 72B on the registration screen 72. Now, suppose that, as described above, the specifying area 70B6 and the specifying area 70B7 have been merged together. In this case, the set of metadata items {Division, Loading Port} defined for the specifying area 70B6, and the set of metadata items {Certificate No.} defined for the specifying area 70B7 are merged together into the following set of metadata items: {Division, Loading Port, Certificate No.}. Accordingly, a set of data values corresponding to the set of metadata items {Division, Loading Port, Certificate No.} is displayed in the display/entry field 72B corresponding to each of Case Nos. X03 and X04.

Now, suppose that, for example, an operation to change the data value "USA" displayed in a display/entry field 72B1 to "UK" has been made on the registration screen 72 illustrated in FIG. 18A. In this case, as illustrated in FIG. 18B, for example, the information displayed in the display/entry field 72B1 of the registration screen 72 is changed from "USA" to "UK". Likewise, if, for example, an operation to change the data value "Nagoya" displayed in a display/entry field 72B2 to "Osaka" has been made, the information displayed in the display/entry field 72B2 of the registration screen 72 is changed from "Nagoya" to "Osaka". Likewise, if, for example, an operation to change the data value "3" displayed in a display/entry field 72B3 to "2" has been made, the information displayed in the display/entry field 72B3 of the registration screen 72 is changed from "3" to "2".

Figure 19:
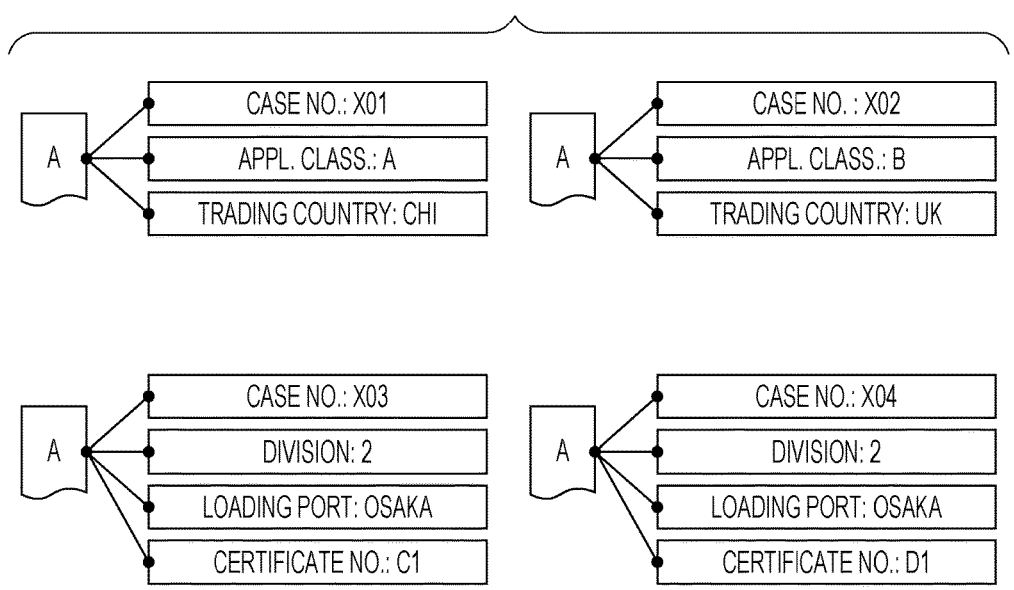
FIG. 19 schematically illustrates an example of metadata information according to the second exemplary embodiment.

Now, suppose that, for example, an operation indicating to execute registration has been made on the registration screen 72 illustrated in FIG. 18B. In this case, as illustrated in FIG. 19, for example, an association created by associating Actual Data A with the three sets of data values {Case No.: X01}, {Appl. Class.: A}, and {Trading Country: CHI} corresponding to the specifying area 70B4 included in the merged specifying area 78A is stored. Further, an association created by associating Actual Data A with the three sets of data values {Case No.: X02}, {Appl. Class.: B}, and {Trading Country: UK} corresponding to the specifying area 70B5 included in the merged specifying area 78A is stored. Further, an association created by associating Actual Data A with the four sets of data values {Case No.: X03}, {Division: 2}, {Loading Port: Osaka}, and {Certificate No.: C1} corresponding to the specifying areas 70B6 and 70B7 included in the merged specifying area 78B is stored. Further, an association created by associating Actual Data A with the four sets of data values {Case No.: X04}, {Division: 2}, {Loading Port: Osaka}, and {Certificate No.: D1} corresponding to the specifying areas 70B8 and 70B9 included in the merged specifying area 78B is stored.

As described above, in the second exemplary embodiment, two or more specifying areas 70B to be merged are specified from among multiple specifying areas 70B, and the specifying areas 70B thus specified are merged together into the merged specifying area 78A or 78B. Further, each set of data values individually defined for each of the two or more specifying areas 70B to be merged is defined for the merged specifying area 78A or 78B. When the icon image 70C is moved into the merged specifying area 78A or 78B, an association is established between actual data and two or more sets of data values individually defined for the merged specifying area 78A or 78B.

Third Exemplary Embodiment

Next, an information processor according to a third exemplary embodiment will be described.

In the first and second exemplary embodiments, when a set of data values is to be set for actual data, the set of data values of metadata is associated with a single piece of actual data. In the third exemplary embodiment, when a set of data values is to be set for actual data, the set of data values of metadata is associated with each of multiple pieces of actual data.

Since the information processor according to the third exemplary embodiment is configured in the same manner as the information processor 10 according to each of the first and second exemplary embodiments, a description of its individual components will be omitted.

Figure 20:
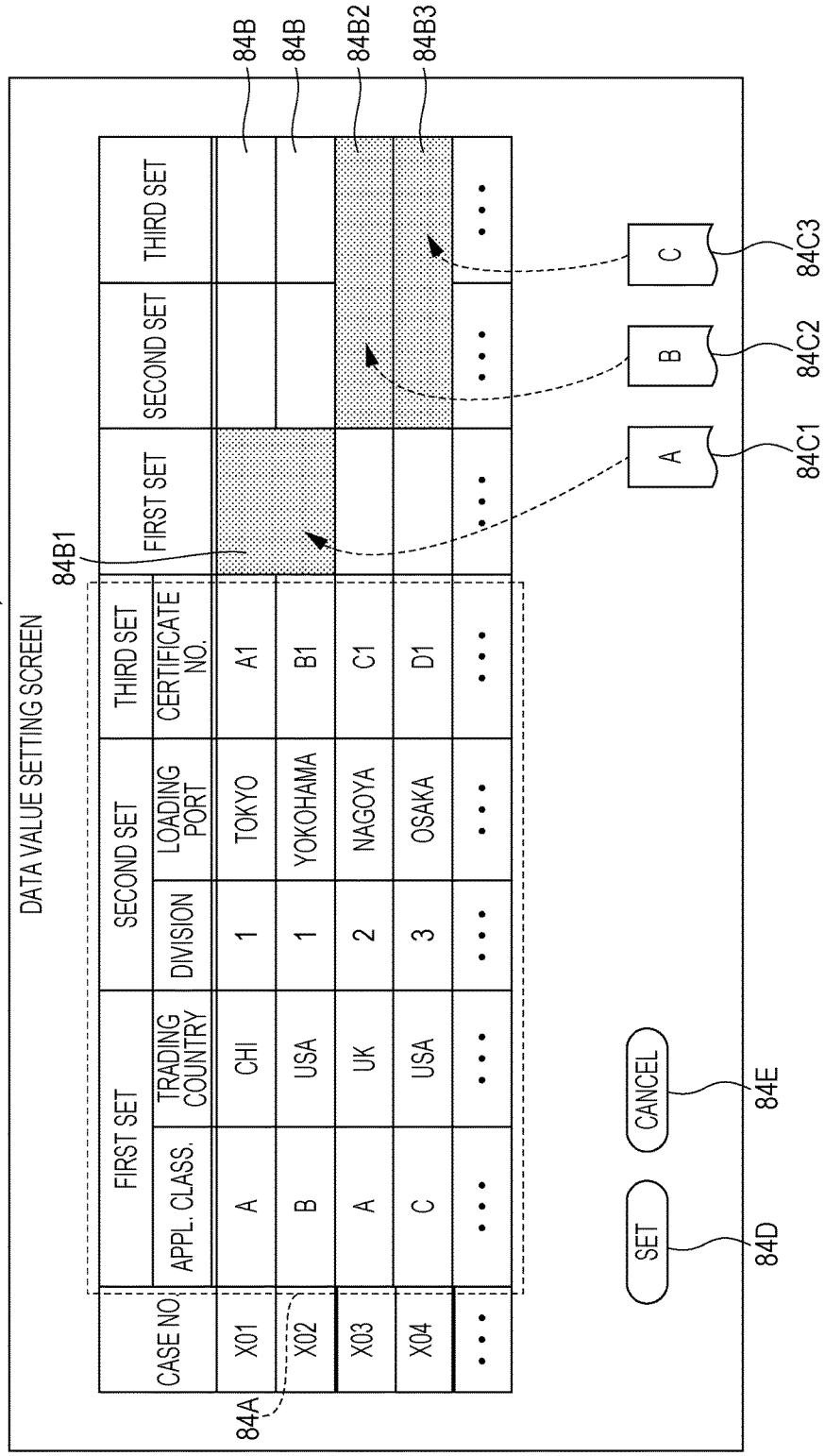
FIG. 20 schematically illustrates an example of a data value setting screen according to a third exemplary embodiment.

In one example, as illustrated in FIG. 20, a data value setting screen 84 according to the third exemplary embodiment has a display field 84A, and specifying areas (including merged specifying areas) 84B. The display field 84A displays a set of data values defined for each column of specifying areas. The specifying areas 84B are used to specify the actual data to be associated with a set of data values. The data value setting screen 84 has an icon image 84C1 representing the identification information of Actual Data A, an icon image 84C2 representing the identification information of Actual Data B, and an icon image 84C3 representing the identification information of Actual Data C. The data value setting screen 84 also has a Set button 84D used to indicate to set an association between actual data and a set of data values, and a Cancel button 84E used to indicate to cancel the setting of an association between actual data and a set of data values. The user looks at the display field 84A, and operates the operating unit 20 to move the display position of the icon image 84C1, 84C2, or 84C3 that represents the actual data for which the user desires to create an association, to a position inside the specifying area 84B. In this way, the actual data for which the user desires to create an association is associated with a set of data values defined for the corresponding specifying area 84B. In the example illustrated in FIG. 20, the icon image 84C1 representing Actual Data A is moved to a specifying area 84B1, the icon image 84C2 representing Actual Data B is moved to a specifying area 84B2, and the icon image 84C3 representing Actual Data C is moved to a specifying area 84B3.

Figure 21:
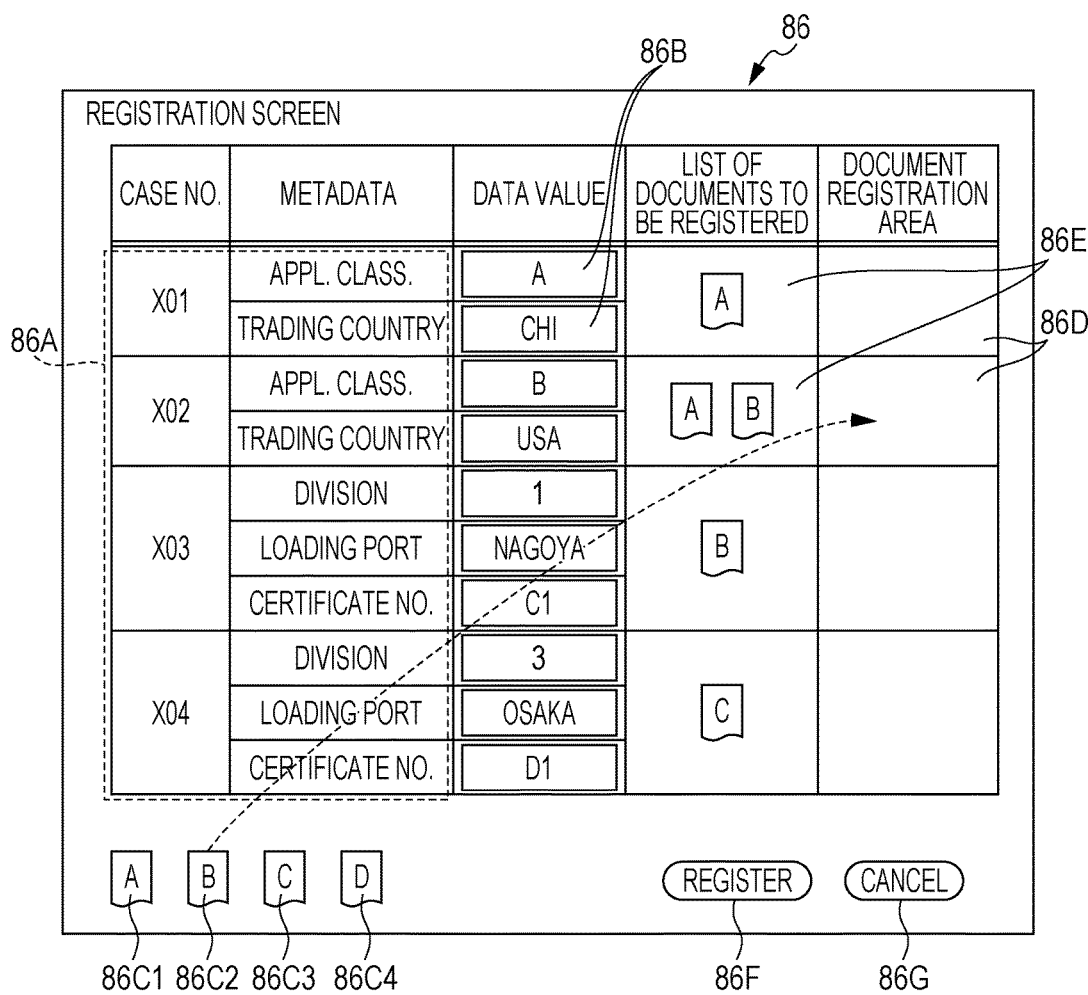
FIG. 21 schematically illustrates an example of a registration screen according to the third exemplary embodiment.

In one example, as illustrated in FIG. 21, a registration screen 86 according to the third exemplary embodiment has a display field 86A used to display, for each individual case number, a set of metadata items that has been set, and a display/entry field 86B used to display and enter, for each individual case number, a set of metadata items that has been set. The registration screen 86 also has specifying areas 86D used to specify the actual data with which to associate a set of data values that has been set. The registration screen 86 also has an icon image 86C1 representing the identification information of Actual Data A, an icon image 86C2 representing the identification information of Actual Data B, an icon image 86C3 representing the identification information of Actual Data C, and an icon image 86C4 representing the identification information of Actual Data D. The registration screen 86 also has display fields 86E used to display a list of actual data associated with a set of data values that has been set. The registration screen 86 also has a Register button 86F used to indicate to register an association between actual data and a set of data values, and a Cancel button 86G used to indicate to cancel the setting of an association between actual data and a set of data values.

The user looks at the display field 86A, and operates the operating unit 20 to change a data value displayed in the display/entry field 86B. Further, the user operates the operating unit 20 to move the display position of the icon image 86C1, 86C2, or 86C3 that represents the actual data for which the user desires to create an association with a set of data values, to a position inside the specifying area 86D. In this way, the actual data for which the user desires to create an association with a set of data values is associated with a set of data values defined for the corresponding display/entry field 86B.

As described above, the information processor 10 according to the third exemplary embodiment displays, on the screen of the display 22, the multiple icon images 84C1, 84C2, and 84C3 each representing the corresponding one of multiple pieces of actual data. Suppose that the display position of one of the icon images 84C1, 84C2, and 84C3 has been moved to a position inside the specifying area 84B. In this case, an association is established between a set of data values defined for the specifying area 84B where the moved icon image 84C1, 84C2, or 84C3 is located, and the actual data identified by the icon image 84C1, 84C2, or 84C3.

Although metadata is associated with a trading-related document file in the first to third exemplary embodiments, the file for which to create an association may not necessarily be a document file. The file for which to create an association may be any file, such as an image file, a video file, or a music file.

FIG. 22 illustrates an example of a list of metadata items for when an association is to be created for a music file. In this case, as illustrated in FIG. 22, for example, the following items are entered on the metadata entry screen: Artist Name, Album Title, Genre, Image, Year Released, and Rating. FIG. 23 illustrates an example of the structure of metadata for when an association is to be created for a music file. That is, as the structure of metadata in this case, for example, the following sets of items are set as illustrated in FIG. 23: Artist Name and Rating; Artist Name, Image, and Album Title; and Year Released and Genre.

Although the data value setting screen 70 and the registration screen 72 are displayed separately in the first to third exemplary embodiments mentioned above, the data value setting screen 70 and the registration screen 72 may be displayed on the same screen. In that case, each time an association is created between actual data and a set of data values on the data value setting screen 70, the display of information related to actual data, and the display of information related to the set of data values on the registration screen 72 may be updated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processor comprising:
a defining unit that defines a plurality of sets of metadata items, and a plurality of sets of data values of metadata corresponding to the sets of metadata items, the sets of metadata items and the sets of data values being associated with each of a plurality of specifying areas displayed on a screen; and an associating unit that associates two or more sets of data values with actual data, the two or more sets of data values being each defined for each of two or more specifying areas specified from among the plurality of specifying areas, wherein the plurality of specifying areas are displayed in substantially grid form on the screen such that the sets of metadata items are defined in a first direction, and the sets of data values corresponding to the set of metadata items are defined in a second direction that crosses the first direction, and a user performs the associating of the two or more sets of data values with actual data multiple times, so as to allow the associating unit to associate multiple sets of data values with the actual data.

2. The information processor according to claim 1, wherein an icon image is further displayed on the screen, the icon image representing identification information of the actual data, and wherein when a display position of the icon image is moved to a position inside one of the plurality of specifying areas, the associating unit associates, with the actual data, a set of data values defined for the specifying area in which the moved icon image is located.

3. The information processor according to claim 2, wherein a plurality of icon images are displayed on the screen, the plurality of icon images each representing identification information of each of a plurality of pieces of actual data; and wherein when a display position of one of the plurality of icon images is moved to a position inside one of the plurality of specifying areas, the associating unit associates a set of data values defined for the specifying area in which the moved icon image is located, with actual data identified by the moved icon image.

4. The information processor according to claim 3, further comprising a merging unit that merges, into a merged specifying area, two or more specifying areas to be merged that are specified from among the plurality of specifying areas, wherein the defining unit defines, for the merged specifying area, sets of data values each defined for each of the two or more specifying areas to be merged, and wherein when the icon image is moved to a position inside the merged specifying area, the associating unit associates, with the actual data, the sets of data values defined for the merged specifying area.

5. The information processor according to claim 3, wherein the associating unit associates the actual data and the set of data values using user input from the screen, the actual data being represented by the icon images, the screen further including a list of actual data associated with the set of data values.

6. The information processor according to claim 2, further comprising a merging unit that merges, into a merged specifying area, two or more specifying areas to be merged that are specified from among the plurality of specifying areas, wherein the defining unit defines, for the merged specifying area, sets of data values each defined for each of the two or more specifying areas to be merged, and wherein when the icon image is moved to a position inside the merged specifying area, the associating unit associates, with the actual data, the sets of data values defined for the merged specifying area.

7. The information processor according to claim 1, further comprising a memory that stores, for each of the two or more sets of data values defined for each of the two or more specifying areas, an association created by the associating unit by associating the actual data with the set of data values.

8. The information processor according to claim 1, further comprising a controller that controls a display to display a setting screen and a registration screen, the setting screen including a plurality of specifying areas for each of which a set of metadata items and a set of data values of metadata corresponding to the set of metadata items are defined, the registration screen including a display area to display, in association with actual data, two or more sets of data values each defined for each of two or more specifying areas specified from among the plurality of specifying areas.

9. The information processor according to claim 8, wherein the controller controls the display to further display an icon image that represents identification information of the actual data, wherein the controller controls the display to display the plurality of specifying areas in substantially grid form on the setting screen such that the set of metadata items is defined in a first direction, and the set of data values corresponding to the set of metadata items is defined in a second direction that crosses the first direction, and wherein the controller controls the display to, in response to movement of a display position of the icon image on the setting screen to a position inside one of the plurality of specifying areas, display a set of data values defined for the specifying area in which the moved icon image is located, in the display area on the registration screen in association with the actual data.

10. A non-transitory computer readable medium storing a program causing a computer to execute a process for processing information, the process comprising:

defining a plurality of sets of metadata items, and a plurality of sets of data values of metadata corresponding to the sets of metadata items, the sets of metadata items and the set of data values being associated with each of a plurality of specifying areas displayed on a screen; and associating two or more sets of data values with actual data, the two or more sets of data values being each defined for each of two or more specifying areas specified from among the plurality of specifying areas, wherein the plurality of specifying areas are displayed in substantially grid form on the screen such that the sets of metadata items are defined in a first direction, and the sets of data values corresponding to the sets of metadata items are defined in a second direction that crosses the first direction, and a user performs the associating of the two or more sets of data values with actual data multiple times, so as to allow the associating unit to associate multiple sets of data values with the actual data.

11. An information processing method comprising:

defining a plurality of sets of metadata items, and a plurality of sets of data values of metadata corresponding to the sets of metadata items, the sets of metadata items and the sets of data values being associated with each of a plurality of specifying areas displayed on a screen; and associating two or more sets of data values with actual data, the two or more sets of data values being each defined for each of two or more specifying areas specified from among the plurality of specifying areas, wherein a user performs associating of the two or more sets of data values with actual data multiple times, so as to allow the associating to associate multiple sets of data values with the actual data.

\* \* \* \* \*